United States Patent
Jung et al.

(10) Patent No.: US 11,191,122 B2
(45) Date of Patent: Nov. 30, 2021

(54) METHOD AND APPARATUS FOR PERFORMING COMMUNICATION IN WIRELESS COMMUNICATION SYSTEM

(71) Applicant: Samsung Electronics Co., Ltd., Gyeonggi-do (KR)

(72) Inventors: Sangyeob Jung, Gyeonggi-do (KR); Soenghun Kim, Gyeonggi-do (KR); Hyunjeong Kang, Gyeonggi-do (KR); Himke Van Der Velde, Gyeonggi-do (KR)

(73) Assignee: Samsung Electronics Co., Ltd

( * ) Notice: Subject to any disclaimer, the term of this patent is extended or adjusted under 35 U.S.C. 154(b) by 64 days.

(21) Appl. No.: 16/738,743

(22) Filed: Jan. 9, 2020

(65) Prior Publication Data

US 2020/0229261 A1 Jul. 16, 2020

(30) Foreign Application Priority Data

Jan. 10, 2019 (KR) .................. 10-2019-0003292
May 2, 2019 (KR) .................. 10-2019-0051830
Aug. 16, 2019 (KR) .................. 10-2019-0100630

(51) Int. Cl.
*H04W 76/20* (2018.01)
*H04W 76/11* (2018.01)
*H04W 76/30* (2018.01)
(Continued)

(52) U.S. Cl.
CPC .......... *H04W 76/20* (2018.02); *H04W 24/10* (2013.01); *H04W 36/0055* (2013.01);
(Continued)

(58) Field of Classification Search
None
See application file for complete search history.

(56) References Cited

U.S. PATENT DOCUMENTS

2015/0172988 A1  6/2015  Lai et al.
2016/0057660 A1* 2/2016  Hong ................ H04W 36/0016
                                                     455/436
(Continued)

FOREIGN PATENT DOCUMENTS

KR   10-2018-0113833   4/2017

OTHER PUBLICATIONS

Google Inc., Ericsson, Sharp, "Correction to Full Configuration", R2-1816556, 3GPP TSG-RAN2 Meeting #104, Nov. 12-16, 2018, 4 pages.
Samsung, "Acquiring MIB Upon Handover", R2-1816305, 3GPP TSG-RAN2 104, Nov. 12-16, 2018, 3 pages.
(Continued)

*Primary Examiner* — Chi H Pham
*Assistant Examiner* — Vladislav Y Agureyev
(74) *Attorney, Agent, or Firm* — The Farrell Law Firm, P.C.

(57) ABSTRACT

A terminal and an operating method thereof are provided in a wireless communication system. The method includes receiving, from a base station, a radio resource control (RRC) message including an indicator regarding a full configuration procedure; when at least one data radio bearer (DRB) corresponding to a protocol data unit (PDU) session regarding the terminal is not included in a DRB add list included in the RRC message, identifying whether an indicator indicating a handover is included in the RRC message; and transmitting, to an upper layer, a message indicating release of a user plane resource regarding the PDU session, based on a result of the identifying.

18 Claims, 18 Drawing Sheets

(51) Int. Cl.
    *H04W 36/00* (2009.01)
    *H04W 36/08* (2009.01)
    *H04W 76/27* (2018.01)
    *H04W 24/10* (2009.01)
    *H04W 88/02* (2009.01)
    *H04W 92/18* (2009.01)

(52) U.S. Cl.
    CPC ............ *H04W 36/08* (2013.01); *H04W 76/11* (2018.02); *H04W 76/27* (2018.02); *H04W 76/30* (2018.02); *H04W 88/023* (2013.01); *H04W 92/18* (2013.01)

(56) References Cited

U.S. PATENT DOCUMENTS

| | | | |
|---|---|---|---|
| 2017/0013668 A1* | 1/2017 | Chang | H04W 76/22 |
| 2018/0227808 A1 | 8/2018 | Bufe et al. | |
| 2019/0132891 A1* | 5/2019 | Wu | H04W 80/08 |
| 2019/0313262 A1* | 10/2019 | Huang-Fu | H04W 28/0268 |
| 2020/0045592 A1* | 2/2020 | Wu | H04W 36/14 |
| 2020/0059987 A1* | 2/2020 | Hong | H04W 72/085 |
| 2020/0137672 A1* | 4/2020 | Rommer | H04W 68/005 |
| 2020/0196264 A1* | 6/2020 | Shih | H04W 56/0045 |

OTHER PUBLICATIONS

3rd Generation Partnership Project; Technical Specification Group Radio Access Network; NR; Radio Resource Control (RRC) Protocol Specification, (Release 15), 3GPP TS 38.331, V15.3.0, Sep. 2018, 445 pages.

International Search Report dated Apr. 28, 2020 issued in counterpart application No. PCT/KR2020/000389, 9 pages.

\* cited by examiner

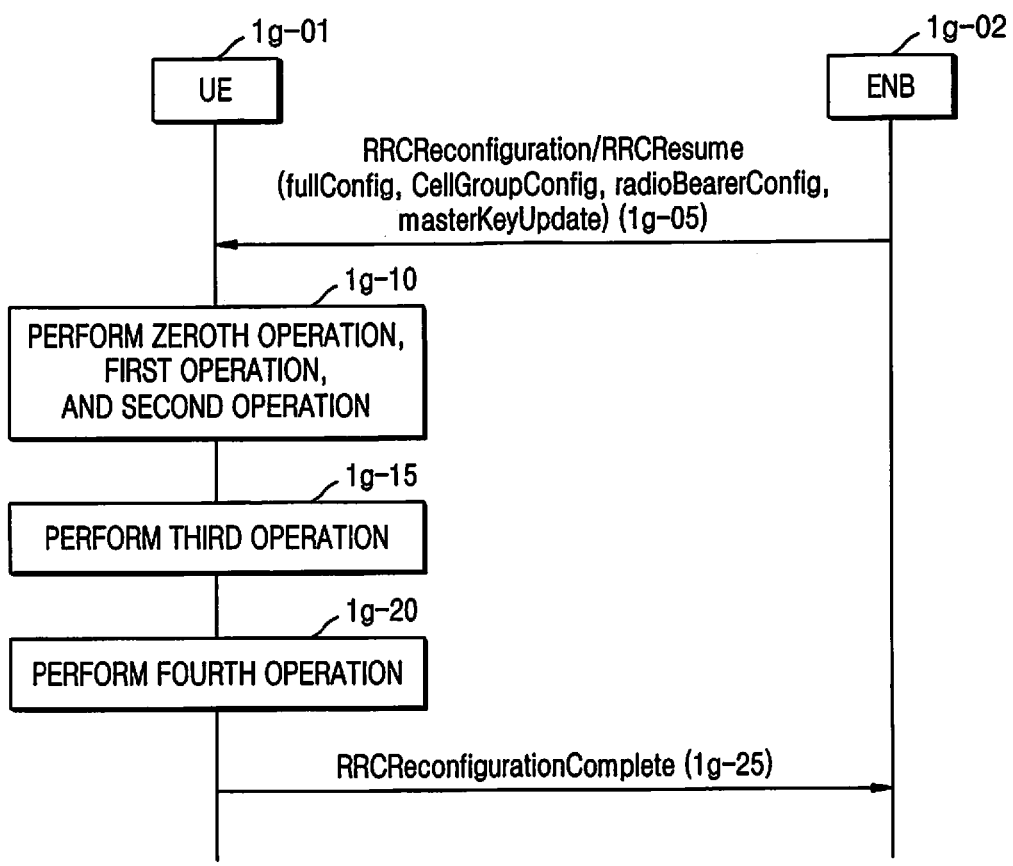

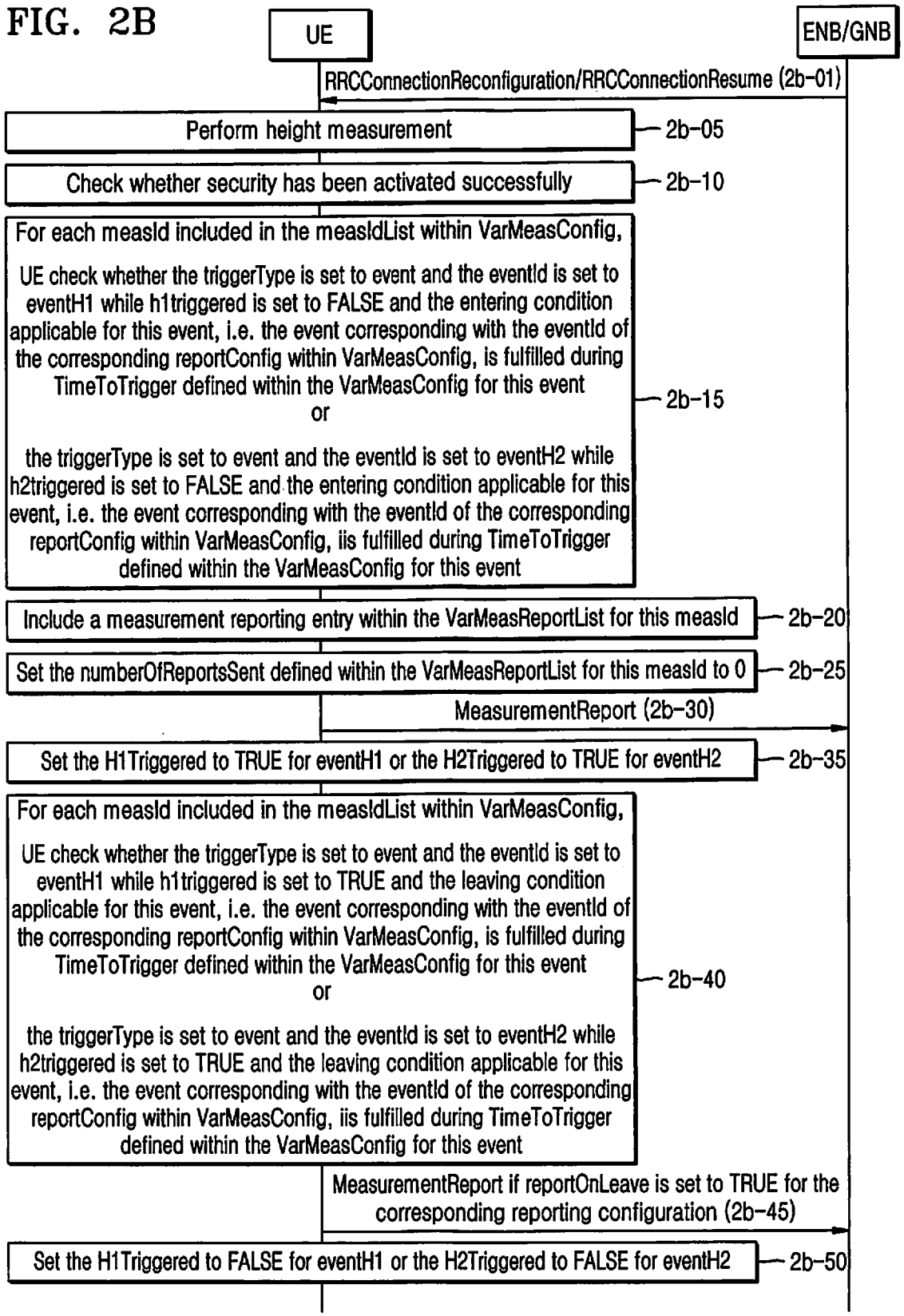

METHOD AND APPARATUS FOR PERFORMING COMMUNICATION IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2019-0003292, 10-2019-0051830, and 10-2019-0100630, which were filed in the Korean Intellectual Property Office on Jan. 10, 2019, May 2, 2019, and on Aug. 16, 2019, respectively, the entire disclosure of each of which is incorporated herein by reference.

BACKGROUND

1. Field

The disclosure relates generally to a wireless communication system, and more particularly, to a method and apparatus for performing communication in a wireless communication system.

2. Description of Related Art

To meet the increasing demand of wireless data traffic due to the commercialization of a 4th generation (4G) system and the increase of multimedia services, an improved 5th generation (5G) communication system or a pre-5G communication system is being developed. '5G communication systems' or 'pre-5G communication systems' may also be referred to as "beyond 4G network communication systems" or "post long-term evolution (LTE) systems".

In order to increase data transmission rates, 5G communication systems are being developed to be implemented in a super-high frequency band (millimeter wave (mmWave)), e.g., a 60 GHz band.

In order to reduce the path loss of radio waves in such a super-high frequency band and to increase a transmission distance of radio waves, various technologies for 5G communication systems are being discussed and studied, such as beamforming, massive multiple-input multiple-output (MIMO), full dimensional MIMO (FD-MIMO), array antennas, analog beam-forming, and large-scale antennas.

In order to improve system network performance for 5G communication systems, various technologies have been developed, e.g., evolved small cells, advanced small cells, cloud radio access networks (RANs), ultra-dense networks, device-to-device communication (D2D), wireless backhaul, moving networks, cooperative communication, coordinated multi-points (CoMP), and interference cancellation. For 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved to the Internet of things (IoT), where distributed configurations, such as objects, exchange information with each other to process the information. Internet of everything (IoE) technology is also emerging, in which technology related to the IoT is combined with, for example, technology for processing big data through connection with a cloud server. In order to implement the IoT, various technological components are used, such as sensing technology, wired/wireless communication and network infrastructures, service interface technology, security technology, etc.

In recent years, technologies including a sensor network for connecting objects, machine to machine (M2M) communication, machine type communication (MTC), etc., have been studied. In the IoT environment, intelligent Internet technology (IT) services may be provided to collect and analyze data obtained from objects connected to each other to create new value in human life. As existing information technology techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of cloud-RAN as a big data processing technology described above may be an example of a convergence of 5G communication technology and IoT technology.

SUMMARY

An aspect of the disclosure is to provide a method and apparatus for performing full configuration in a wireless communication system.

Another aspect of the disclosure is to provide a method and apparatus for performing aerial measurement on an H1/H2 event in a wireless communication system.

Another aspect of the disclosure is to provide a method and apparatus using a preconfiguration resource for supporting vehicle communication in a wireless communication system.

In accordance with an aspect of the disclosure, an operating method is provided for a terminal in a wireless communication system. The operating method includes receiving, from a base station, a radio resource control (RRC) message including an indicator regarding a full configuration procedure; when at least one data radio bearer (DRB) corresponding to a protocol data unit (PDU) session regarding the terminal is not included in a DRB add list included in the RRC message, identifying whether an indicator indicating handover is included in the RRC message; and transmitting, to an upper layer, a message indicating release of a user plane resource regarding the PDU session, based on a result of the identifying.

In accordance with another aspect of the disclosure, a terminal is provided in a wireless communication system. The terminal includes a transceiver; and at least one processor configured to: receive, from a base station, a radio resource control (RRC) message including an indicator regarding a full configuration procedure; when at least one data radio bearer (DRB) corresponding to a protocol data unit (PDU) session regarding the terminal is not included in a DRB add list included in the RRC message, identify whether an indicator indicating handover is included in the RRC message; and transmit, to an upper layer, a message indicating release of a user plane resource regarding the PDU session, based on a result of the identification.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1G is a signal flow diagram illustrating UE operation procedures when a UE in an RRC connected mode receives an RRCReconfiguration message or an RRCResume message from a next generation node B (gNB), according to an embodiment;

FIG. 2B is a signal flow diagram illustrating procedures in which a UE in an RRC connected mode performs measurement when an eNB or gNB provides measurement configuration applicable in the RRC connected mode to the UE, according to an embodiment;

DETAILED DESCRIPTION

Hereinafter, operation principles of the disclosure will be described with reference to accompanying drawings. While describing the disclosure, detailed descriptions of related well-known functions or configurations may be omitted when they may unnecessarily obscure the essence of the disclosure. Also, terms used below are defined in consideration of functions in the disclosure, and may have different meanings according to an intention of a user or operator, customs, etc. Thus, the terms should be defined based on the description throughout the specification.

Throughout the disclosure, the expression "at least one of a, b or c" indicates only a, only b, only c, both a and b, both a and c, both b and c, all of a, b, and c, or variations thereof.

Examples of a terminal may include a UE, a mobile station (MS), a cellular phone, a smartphone, a computer, and a multimedia system capable of performing a communication function.

A controller may also be referred to as a processor.

A layer (or a layer apparatus) may also be referred to as an entity.

Herein, terms for identifying access nodes, terms denoting network entities, terms denoting messages, terms denoting interfaces between network entities, terms denoting various types of identification information, etc., are exemplified for convenience of description. Thus, the terms used in the disclosure are not limited and other terms denoting targets having the same technical meanings may be used.

Hereinafter, for convenience of description, the disclosure uses terms and names defined by the 3rd Generation Partnership Project Long Term Evolution (3GPP LTE) standard. However, the disclosure is not limited by such terms and names, and may be equally applied to systems conforming to other standards. An evolved node B (eNB) may be interchangeably referred to as a next generation node B (gNB) for convenience of description. That is, a base station described as an eNB may also indicate a gNB.

Figure 1A:
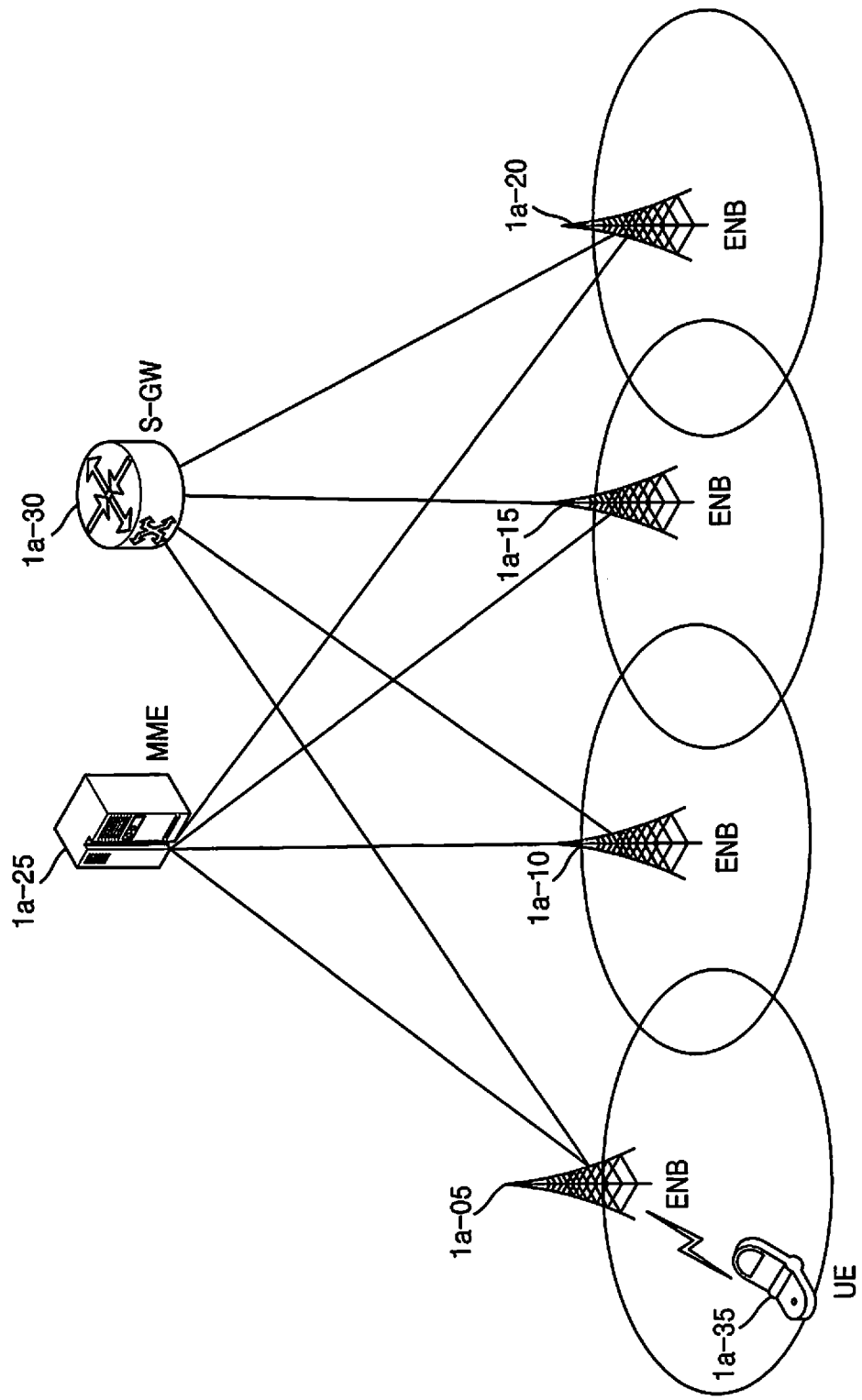
FIG. 1A illustrates of an LTE system, according to an embodiment.

FIG. 1A illustrates an LTE system, according to an embodiment.

Referring to FIG. 1A, a radio access network (RAN) of the LTE system includes evolved base stations (e.g., evolved node Bs (eNBs), node Bs (NBs) or base stations) 1a-05, 1a-10, 1a-15, and 1a-20, a mobility management entity (MME) 1a-25, and a serving-gateway (S-GW) 1a-30. A UE (or terminal) 1a-35 may access an external network via the eNB 1a-05, 1a-10, 1a-15, or 1a-20 and the S-GW 1a-30.

The eNB 1a-05, 1a-10, 1a-15, or 1a-20 may correspond to an existing NB of a UMTS. The eNB 1a-05, 1a-10, 1a-15, or 1a-20 may be connected to the UE 1a-35 through a radio channel and may perform complex functions compared to the existing NB. In the LTE system, all user traffic including a real-time service such as voice over Internet protocol (VoIP) may be provided via a shared channel. Accordingly, an entity that schedules UEs by gathering state information such as buffer states, available transmit power states, and channel states of the UE 1a-35 is used, and the eNB 1a-05, 1a-10, 1a-15, or 1a-20 may operate as the entity.

A single eNB may generally control multiple cells. For example, the LTE system may use radio access technology such as orthogonal frequency division multiplexing (OFDM) at a bandwidth of 20 MHz to achieve a data rate of 100 Mbps. Adaptive modulation and coding (AMC) may be used to determine a modulation scheme and a channel coding rate in accordance with a channel state of the UE 1a-35.

The S-GW 1a-30 may provide data bearers and may configure or release the data bearers under the control of the MME 1a-25. The MME 1a-25 is an entity for performing a mobility management function and various control functions for the UE 1a-35 and may be connected to the eNBs 1a-05, 1a-10, 1a-15, and 1a-20.

Figure 1B:
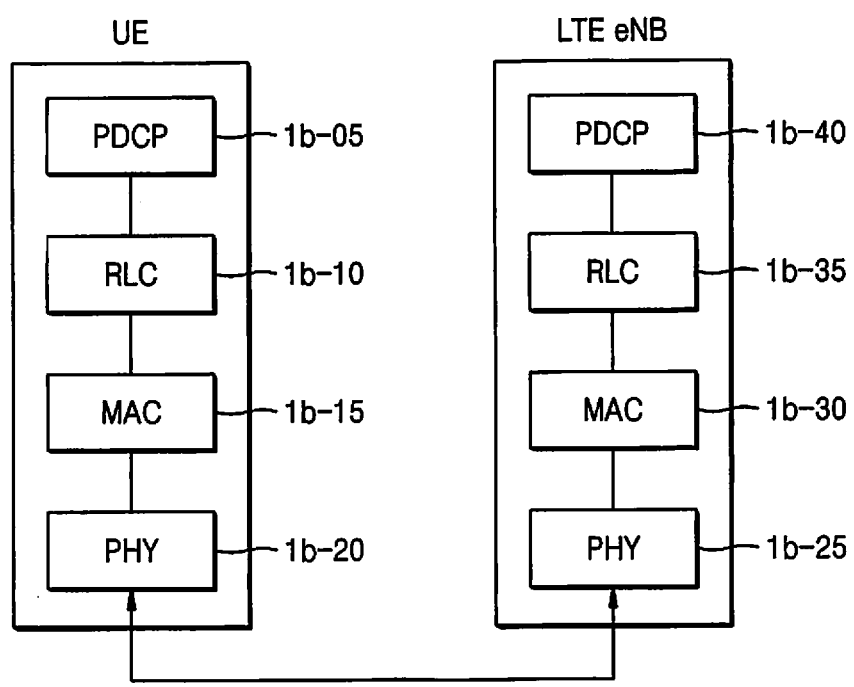
FIG. 1B illustrates a radio protocol architecture in an LTE system, according to an embodiment.

FIG. 1B illustrates a radio protocol architecture in an LTE system, according to an embodiment.

Referring to FIG. 1B, the radio protocol architecture of the LTE system may include packet data convergence protocol (PDCP) layers 1b-05 and 1b-40, radio link control (RLC) layers 1b-10 and 1b-35, and media access control (MAC) layers 1b-15 and 1b-30 respectively for a UE and an eNB. The PDCP layer 1b-05 or 1b-40 is in charge of IP header compression/decompression, etc. Main functions of the PDCP layer 1b-05 or 1b-40 may be summarized as below:

- Header compression and decompression: robust header compression (ROHC) only
- Transfer of user data
- In-sequence delivery of upper layer PDUs at PDCP re-establishment procedure for RLC AM
- For split bearers in dual connectivity (DC) (only support for RLC acknowledged mode (AM)): PDCP PDU routing for transmission and PDCP PDU reordering for reception
- Duplicate detection of lower layer service data units (SDUs) at PDCP re-establishment procedure for RLC AM
- Retransmission of PDCP SDUs at handover and, for split bearers in DC, of PDCP PDUs at PDCP data-recovery procedure, for RLC AM
- Ciphering and deciphering
- Timer-based SDU discard in uplink The RLC layer 1b-10 or 1b-35 may perform, e.g., an automatic repeat request (ARQ) operation by reconfiguring PDCP PDUs to appropriate sizes. Main functions of the RLC layer 1b-10 or 1b-35 may be summarized as below:

- Data transfer (Transfer of upper layer PDUs)
- Error Correction through ARQ (only for AM data transfer))
- Concatenation, segmentation and reassembly of RLC SDUs (only for unacknowledged mode (UM) and AM data transfer))
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment The MAC layer 1b-15 or 1b-30 is connected to multiple RLC layers configured for a single UE and may multiplex RLC PDUs into a MAC PDU and demultiplex the RLC PDUs from the MAC PDU. Main functions of the MAC layer 1b-15 or 1b-30 may be summarized as below:

- Mapping between logical channels and transport channels
- Multiplexing/demultiplexing of MAC SDUs belonging to one or different logical channels into/from transport blocks (TB) delivered to/from the physical layer on transport channels
- Scheduling information reporting
- Error correction through hybrid automatic repeat request (HARQ)
- Priority handling between logical channels of one UE
- Priority handling between UEs by means of dynamic scheduling
- Multimedia broadcast multicast services (MBMS) service identification
- Transport format selection
- Padding A physical (PHY) layer 1b-20 or 1b-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Figure 1C:
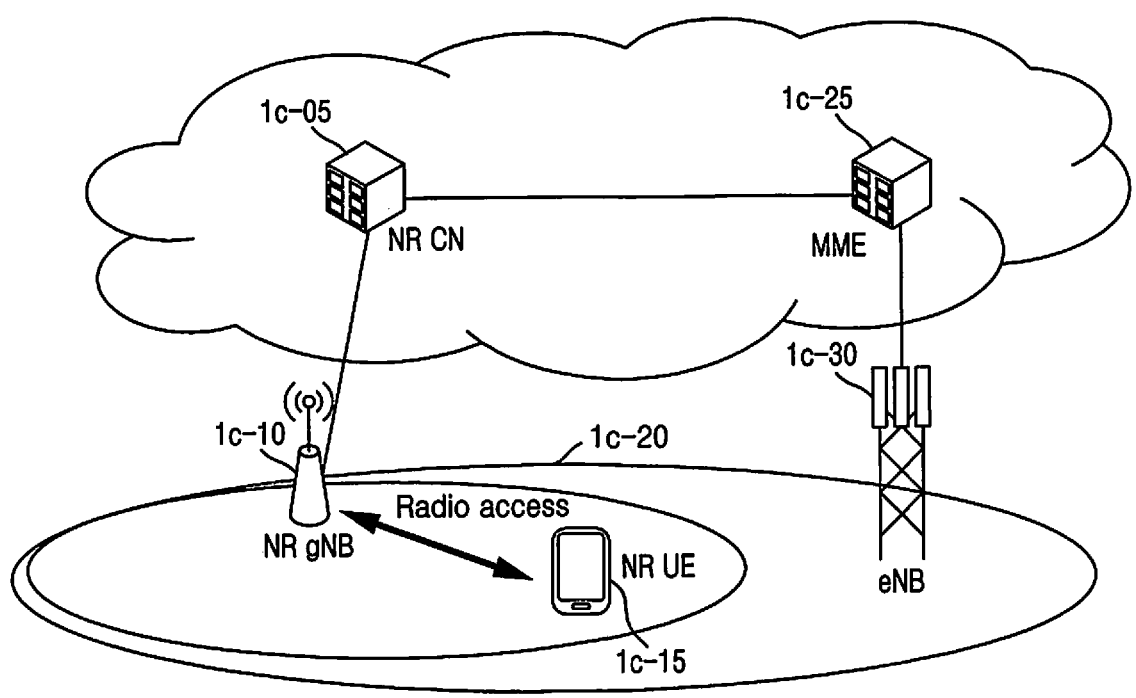
FIG. 1C illustrates a next-generation mobile communication system, according to an embodiment.

FIG. 1C illustrates a next-generation mobile communication system, according to an embodiment.

Referring to FIG. 1C, a RAN of the next-generation mobile communication system (e.g., a new radio (NR) or 5G system) may include a new radio node B (NR NB) or new radio next generation node B (NR gNB) 1c-10 and a new radio core network (NR CN) or next generation core network (NG CN) 1c-05. A new radio user equipment (NR UE) or UE 1c-15 may access an external network via the NR gNB 1c-10 and the NR CN 1c-05.

The NR gNB 1c-10 may correspond to an eNB of an existing LTE system. The NR gNB 1c-10 is connected to the NR UE 1c-15 through radio channels and may provide superior services compared to an existing NB. In the next-generation mobile communication system, all user traffic may be provided via a shared channel. Accordingly, an entity that schedules UE by gathering state information such as buffer states, available transmit power states, and channel states of the UEs 1c-15 is used, and the NR gNB1c-10 may operate as the entity. A single NR gNB may control multiple cells. In the next-generation mobile communication system, a bandwidth greater than the maximum bandwidth of LTE may be given to achieve a current ultrahigh data rate, and beamforming technology may be added to radio access technology such as OFDM. Also, AMC may be used to determine a modulation scheme and a channel coding rate in accordance with a channel state of the UE 1c-15.

The NR CN 1c-05 may perform functions such as mobility support, bearer setup, and quality of service (QoS) setup. The NR CN 1c-05 is an entity for performing a mobility management function and various control functions for the UE 1c-15 and may be connected to multiple NR gNBs 1c-10. The next generation mobile communication system may cooperate with the existing LTE system, and the NR CN 1c-05 may be connected to an MME 1c-25 through a network interface. The MME 1c-25 may be connected to an existing eNB 1c-30.

Figure 1D:
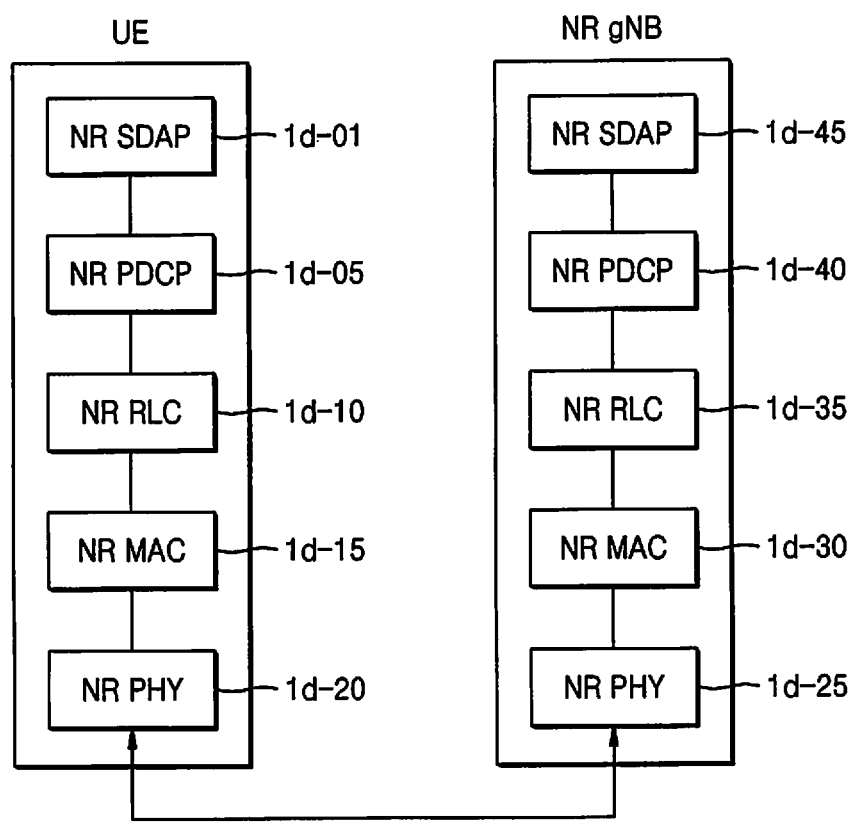
FIG. 1D illustrates a radio protocol architecture of a next-generation mobile communication system, according to an embodiment.

FIG. 1D illustrates a radio protocol architecture of a next-generation mobile communication system, according to an embodiment.

Referring to FIG. 1D, the radio protocol architecture of the next-generation mobile communication system includes NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30, respectively, for a UE and an NR gNB.

Main functions of the NR SDAP layers 1d-01 and 1d-45 may include some of the following functions:
- Transfer of user plane data
- Mapping between QoS flow and a data radio bearer (DRB) for both downlink (DL) and uplink (UL)
- Marking QoS flow identifier (ID) in both DL and UL packets
- Reflective QoS flow to DRB mapping for the UL SDAP PDUs With respect to an SDAP layer, the UE may receive, via an RRC message for the SDAP layer, settings on whether to use a header of the SDAP layer or use a function of the SDAP layer for each PDCP layer, each bearer, or each logical channel. When an SDAP header is configured, the UE may instruct a non-access stratum (NAS) reflective QoS 1-bit indicator and an access stratum (AS) reflective QoS 1-bit indicator of the SDAP header to update or reconfigure mapping information regarding the data bearer and the QoS flow of UL and DL. The SDAP header may include a QoS flow ID indicating a QoS. QoS information may be used as data processing priority information, scheduling information, etc., for supporting a smooth service.

Main functions of the NR PDCP layer 1d-05 or 1d-40 may include some of the following functions:
- Header compression and decompression: ROHC only
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink A reordering function of the NR PDCP layer 1d-05 or 1d-40 may include a function of reordering PDCP PDUs received from a lower layer, based on a PDCP sequence number (SN). The reordering function of the NR PDCP layer 1d-05 or 1d-40 may include a function of delivering the reordered data to an upper layer in order or a function of immediately delivering the reordered data without considering an order, may include a function of recording missing PDCP PDUs by reordering the PDCP PDUs, may include a function of reporting status information of the missing PDCP PDUs to a transmitter, or may include a function of requesting to retransmit the missing PDCP PDUs.

The main functions of the NR RLC layer 1d-10 or 1d-35 may include at least some of the following functions:
- Transfer of upper layer PDUs
- In-sequence delivery of upper layer PDUs
- Out-of-sequence delivery of upper layer PDUs
- Error correction through ARQ
- Concatenation, segmentation and reassembly of RLC SDUs
- Re-segmentation of RLC data PDUs
- Reordering of RLC data PDUs
- Duplicate detection
- Protocol error detection
- RLC SDU discard
- RLC re-establishment In-sequence delivery of the NR RLC layer 1d-10 or 1d-35 may include a function of delivering RLC SDUs received from a lower layer, to an upper layer in order. When an RLC SDU is segmented into multiple RLC SDUs and received, the in-sequence delivery of the NR RLC layer 1d-10 or 1d-35 may include a function of reassembling the multiple RLC SDUs and delivering the RLC SDUs.

The in-sequence delivery of the NR RLC layer 1d-10 or 1d-35 may include a function of reordering received RLC PDUs on an RLC SN or PDCP SN basis, a function of recording missing RLC PDUs by reordering the RLC PDUs, a function of reporting status information of the missing RLC PDUs to a transmitter, or a function of requesting to retransmit the missing RLC PDUs.

The in-sequence delivery of the NR RLC layer 1d-10 or 1d-35 may include a function of delivering only RLC SDUs previous to a missing RLC SDU, to the upper entity in order, when the missing RLC SDU exists. The in-sequence delivery of the NR RLC layer 1d-10 or 1d-35 may include a function of delivering all RLC SDUs received before a timer is started, to the upper entity in order, although a missing RLC SDU exists, when a certain timer is expired, or a function of delivering all RLC SDUs received up to a current time, to the upper entity in order, although a missing RLC SDU exists, when a certain timer is expired.

The NR RLC layer 1d-10 or 1d-35 may process the RLC PDUs in order of reception, regardless of sequence numbers, and deliver the RLC PDUs to a PDCP entity out of order (out of sequence delivery), and in the case of segments, the segments stored in a buffer or to be received later may be received and delivered to the NR PDCP layer 1d-05 or 1d-40.

When the NR RLC layer 1d-10 or 1d-35 receives segments, the NR RLC layer 1d-10 or 1d-35 may reassemble the segments received or stored in a buffer, into a whole RLC PDU and deliver the RLC PDU to the NR PDCP layer 1d-05 or 1d-40. The NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

Out-of-sequence delivery of the NR RLC layer 1d-10 or 1d-35 may denote a function of delivering RLC SDUs received from a lower layer, immediately to an upper layer out of an order. The out-of-sequence delivery of the NR RLC layer 1d-10 or 1d-35 may include a function of reassembling multiple RLC SDUs segmented from an RLC SDU and delivering the RLC SDU when the segmented RLC SDUs are received. The out-of-sequence delivery of the NR RLC layer 1d-10 or 1d-35 may include a function of storing RLC SNs or PDCP SNs of received RLC PDUs and recording missing RLC PDUs by ordering the RLC PDUs.

The NR MAC layer 1d-15 or 1d-30 may be connected to multiple NR RLC layers 1d-10 or 1d-35 configured for a single UE, and main functions of the NR MAC layer 1d-15 or 1d-30 may include at least some of the following functions:
- Mapping between logical channels and transport channels
- Multiplexing/demultiplexing of MAC SDUs
- Scheduling information reporting
- Error correction through HARQ
- Priority handling between logical channels of one UE
- Priority handling between UEs through dynamic scheduling
- MBMS service identification
- Transport format selection
- Padding A PHY layer 1d-20 or 1d-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Figure 1E:
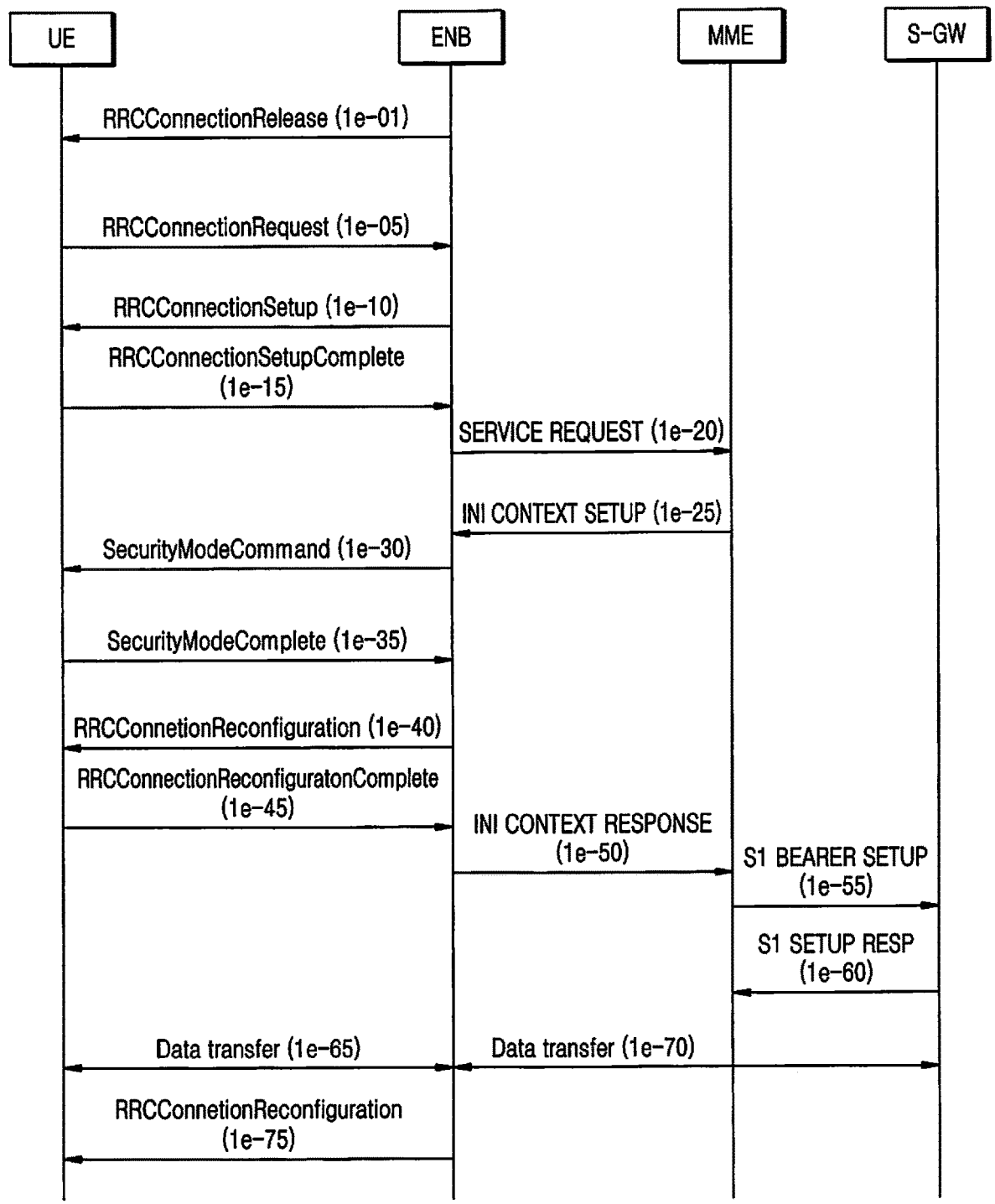
FIG. 1E is a signal flow diagram illustrating procedures in which, when an evolved node B (eNB) releases a connection with a user equipment (UE), the UE switches a radio resource control (RRC) connected mode to an RRC idle mode and procedures in which the UE establishes a connection with the eNB to switch the RRC idle mode to the RRC connected mode, according to an embodiment.

FIG. 1E is a signal flow diagram illustrating procedures in which, when an eNB releases a connection with a UE, the UE switches an RRC connected mode to an RRC idle mode and procedures in which the UE establishes a connection with the eNB to switch the RRC idle mode to the RRC connected mode, according to an embodiment.

Referring to FIG. 1E, when the UE that transmits or receives data in the RRC connected mode does not transmit or receive data for a certain reason or for a certain time, the eNB transmits an RRCConnectionRelease message to the UE to switch to the RRC idle mode (step 1e-01). When data to be transmitted is generated, the UE that has not currently established a connection (hereinafter, the idle mode UE) may perform an RRC connection establishment procedure with the eNB.

The UE establishes reverse transmission synchronization with the eNB through a random access procedure and transmit an RRCConnectionRequest message to the eNB (step 1e-05). The RRCConnectionRequest message may include an identity of the UE, an establishment cause, etc.

The eNB transmits an RRCConnectionSetup message such that the UE establishes an RRC connection (step 1e-10). The RRCConnectionSetup message may include RRC connection configuration information or the like. The RRC connection may also referred to as signaling radio bearer (SRB) and may be used during transmission and reception of an RRC message that is a control message between the UE and the eNB. The UE that established the RRC connection transmits an RRCConnectionSetupComplete message to the eNB (step 1e-15). The RRCConnectionSetupComplete message may include a control message such as a SERVICE REQUEST message for requesting an MME to configure a bearer for a certain service by the UE.

The eNB transmits the SERVICE REQUEST message included in the RRCConnectionSetupComplete message to the MME (step 1e-20), and the MME may determine whether to provide the service requested by the UE. As a result of the determination, when the service requested by the UE is to be provided, the MME transmits an INITIAL CONTEXT SETUP REQUEST message to the eNB (step 1e-25). The INITIAL CONTEXT SETUP REQUEST message may include QoS information to be applied in configuring a DRB, security information (e.g., a security key, a security algorithm, etc.) to be applied to the DRB, etc.

The eNB exchanges a SecurityModeCommand message (step 1e-30) and a SecurityModeComplete message (step 1e-35) with the UE to configure a security mode. After the security mode is configured, the eNB transmits an RRCConnectionReconfiguration message to the UE (step 1e-40). The RRCConnectionReconfiguration message may include configuration information about the DRB to process user data, and the UE may configure the DRB by using the configuration information and transmits an RRCConnectionReconfigurationComplete message to the eNB (step 1e-45).

Upon completing the DRB configuration with the UE, the eNB transmits an INITIAL CONTEXT SETUP COMPLETE message to the MME (step 1e-50), and upon reception, the MME exchanges an S1 BEARER SETUP message and an S1 BEARER SETUP RESPONSE message with an S-GW to configure an S1 bearer (steps 1e-55 and 1e-60). The S1 bearer is a connection for data transmission, which is configured between the S-GW and the eNB, and corresponds to the DRB in a one-to-one manner.

After the above procedures are completed, the UE may transmit or receive data to or from the eNB through the S-GW in steps 1e-65 and 1e-70. As such, general data transmission processes may largely include three steps of RRC connection establishment, security setting, and DRB configuration. The eNB may transmit, to the UE, an RRCConnectionReconfiguration message to renew, add, or change the configuration for a certain reason (step 1e-75).

Figure 1F:
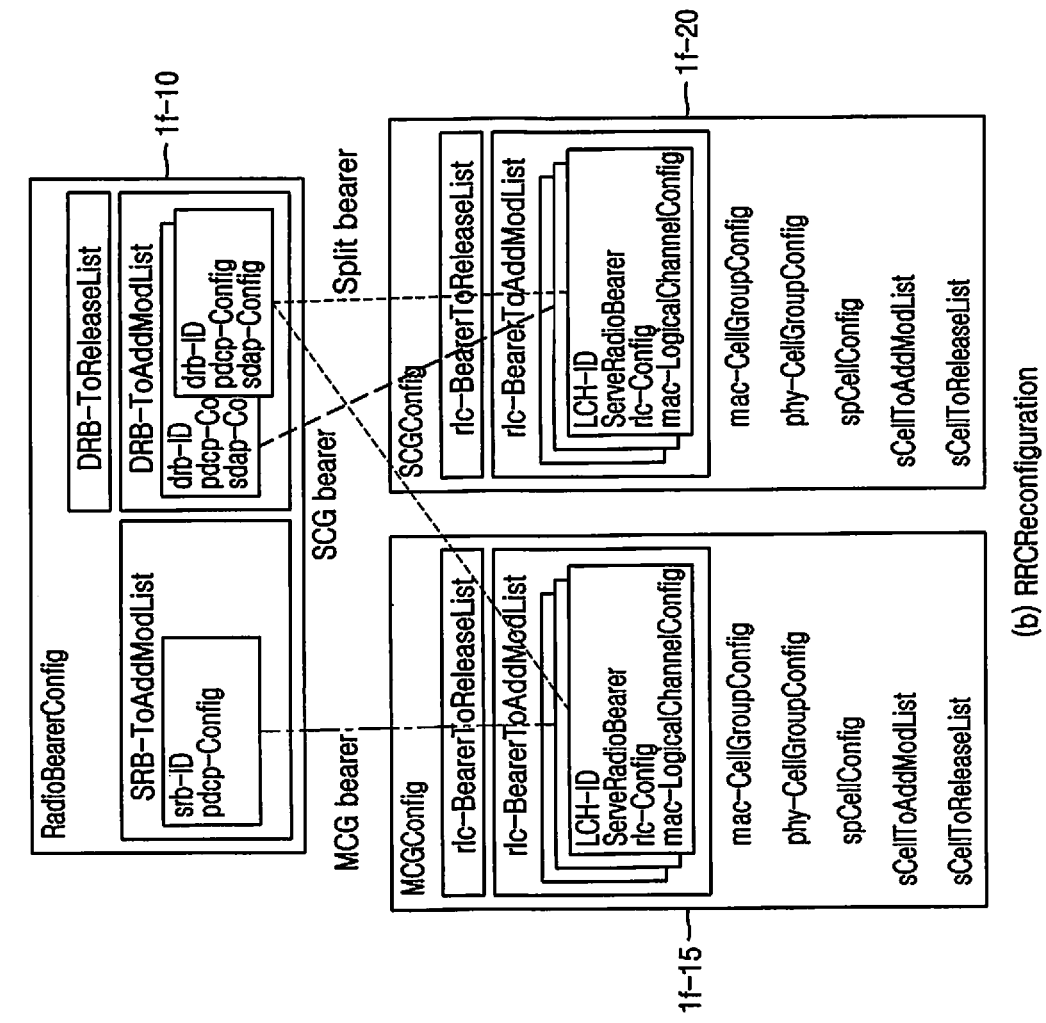
FIG. 1F illustrates a mobile communication system, according to an embodiment.
Figure 1F:
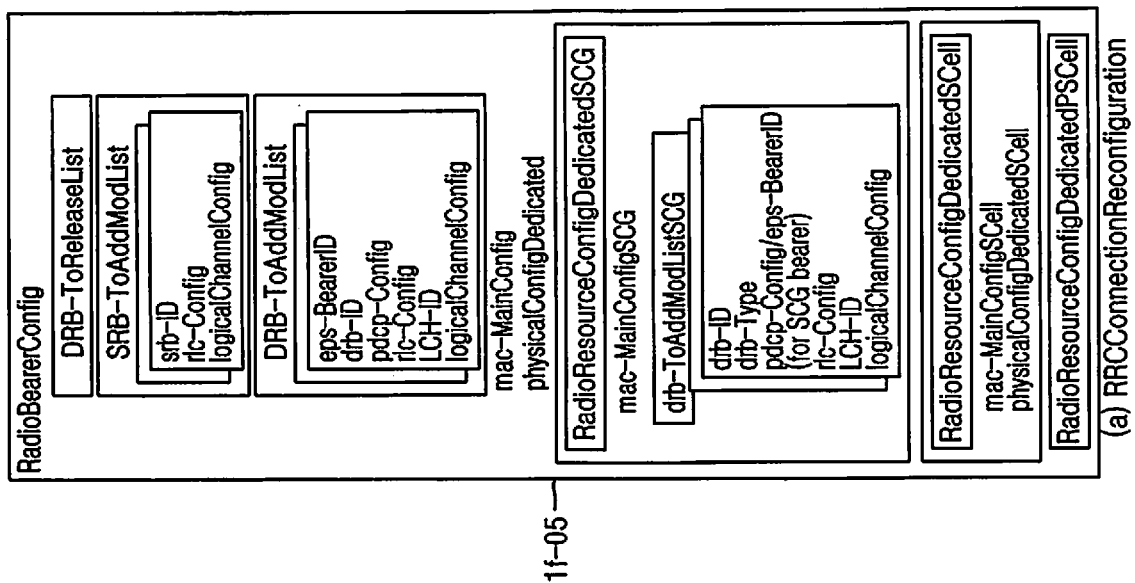

FIG. 1F illustrates a mobile communication system, according to an embodiment.

Referring to FIG. 1F, in an LTE system, SRB or DRB may be configured by using an RRCConnectionReconfiguration message 1f-05. SRB-ToAddModList and DRB-ToAddModList include configuration information of the SRB and the DRB, respectively. For example, DRB-ToAddModList may generally include eps-bearerID, drb-ID, pdcp-Config, rlc-Config, logical channel ID (LCH-ID), and logicalChannelConfig. SRB-ToReleaseList or DRB-ToReleaseList may be used to release the SRB or DRB. That is, DRB related configuration information may be included. In an initial LTE system, carrier aggregation and dual connectivity were not supported. However, by introducing the above technologies, new information elements (IEs) are defined to configure SRB and DRB in an SCell. Also, it was required for the dual connectivity to indicate a bearer type. As a result, the current RRCConnectionReconfiguration message 1f-05 has a very complicated structure.

In a next-generation mobile communication system, an RRC signaling structure is designed with support for carrier aggregation and dual connectivity, and a central unit-distributed unit (CU-DU) structure from an early version. Thus, the next-generation mobile communication system has an RRC signaling structure that is easier to understand and more efficient than a previous system. General SRB-ToAddModList and DRB-ToAddModList IEs may be used, but unlike before, the SRB-ToAddModList and DRB-ToAddModList IEs may include only configuration information related to SRB ID or DRB ID regarding SRB or DRB, PDCP layer, and SDAP layer. SRB-ToAddModList and DRB-ToAddModList may be included in a RadioBearerConfig IE 1f-10.

Instead, configuration information below an RLC layer may be provided through rlc-BearerToAddModList that is a new IE. rlc-BearerToAddModList may be set in cell group units 1f-15 and 1f-20. rlc-BearerToAddModList may generally include LCH-ID, ServedRadioBearer, rlc-Config, and mac-LogicalChannelConfig. Accordingly, to use one SRB or DRB, SRB-ToAddModList or DRB-ToAddModList should be configured together with rlc-BearerToAddModList, and SRB-ToAddModList or DRB-ToAddModList applied to one SRB or DRB and rlc-BearerToAddModList should be mapped (i.e., srb-ID or drb-ID is mapped by being included in ServedRadioBearer).

FIG. 1G is a signal flow diagram illustrating UE operation procedures when a UE 1g-01 in an RRC connected mode receives an RRCReconfiguration message or an RRCResume message from a gNB 1g-02, according to an embodiment.

Referring to FIG. 1G, when a certain condition is satisfied, the gNB 1g-02 transmits the RRCReconfiguration or RRCResume message where full configuration is set to the UE 1g-01 (step 1g-05). The full configuration denotes that all configuration information previously applied is deleted and default configuration information or configuration information newly provided by the gNB 1g-02 is applied. The full configuration may be used when a UE performs handover (when the UE receives a RRCReconfiguration or RRCResume message including reconfigurationWithSync from a base station), when a target base station is unable to understand configuration information by a source base station, or when a base station switches basic configuration information instead of expanded configuration information with respect to a UE.

In particular, a source base station may transmit, to a target base station, configuration information that was provided to a UE, when handover is performed on one UE. The target base station may transmit, to the source base station, only a portion of the received configuration information, which is to be modified. The source information may transmit, to the UE, configuration information applicable by the target base station. Such procedures may reduce an amount of information to be transmitted between entities. However, when the source base station is a high version (for example, Rel-15) and the target base station is a low version (for example, Rel-8), the target base station may be unable to understand the target information that was provided to the UE even when the source base station transmits the configuration information to the target information. When the version increases, new IEs or fields may be added to compensate an existing function or support a new function. Such new information is unable to be understood by a base station of a lower version.

Thus, in this case, the target base station may request the source base station for full configuration, and all configuration information may be transmitted to the source base station.

Herein, an RRC message may include one or a plurality of pieces of information listed below when a base station triggers or does not trigger full configuration for a certain UE by using an RRCReconfiguration or RRCResume message, considering a structure of NR configuration information described above:

fullConfig: indicator indicating to perform full configuration

CellGroupConfig: IE including configuration information of cell group unit (master cell group (MCG) and/or secondary cell group (SCG))

masterKeyUpdate: IE including information for updating security key used by UE in MCG radioBearerConfig: IE including configuration information regarding SRB and/or DRB When full configuration is triggered, the UE 1g-01 may sequentially perform a zeroth operation, a first operation, and a second operation, in step 1g-10.

Zeroth Operation:

1> All radio configurations currently dedicatedly configured may be released/deleted, except for supplementary configuration information associated with an MCG cell radio network temporary identifier (C-RNTI) and a master key. This is to delete all pieces of configuration information pre-applied by a UE and to apply default configuration information or configuration information newly provided by a base station.

1> When reconfigurationWithSync (handover) is included in spCellConfig that may be included in masterCellGroup, 2> All current common radio configurations are released/deleted and default values may be used for a T310 timer, a T311 timer, an N310 constant, and an N311 constant.

1> Otherwise (when an RRCReconfiguration message in which full configuration is triggered is received after a re-establishment procedure is performed), 2> A T310 timer value, a T311 timer value, an N310 constant value, and an N311 constant value signaled from ue-TimersAndConstants included in a received SIB1 may be used.

1> A default physical channel configuration, a default semi-persistent scheduling/configured grant configuration, or a default MAC main configuration is applied because a UE released/deleted all pieces of configuration information.

1> When an srb-Identity is explicitly included in srb-ToAddModList that may be included in radioBearerConfig to reconfigure SRB, 2> A specified configuration may be applied to SRB regarding corresponding srb-Identity.

2> Also, default PDCP configuration information, default RLC configuration information, and default logical channel configuration information may be applied to a corresponding SRB.

First Operation:

1> Regarding a PDU session belonging to a current UE configuration,

2> an SDAP entity may be released because the PDU session and the SAP entity have a one-to-one mapping relationship, and thus, the SDAP entity mapped to the PDU session belonging to the current UE configuration and corresponding SDAP configuration information may be reconfigured by using configuration information stored in SRB-ToAddModList and/or DRB-ToAddModList later.

2> Each DRB associated with the PDU session and corresponding drb-identity may be released. Here, the UE releases the drb-identity together because, when NR configuration information is considered, the base station may reduce signaling overhead while the UE may efficiently release a PDCP entity and an RLC bearer. Because there may be one or a plurality of drb-identity associated with one PDU session, the UE may perform a DRB releasing operation via following two methods:

When the base station explicitly includes drb-identity in DRB-ToReleaseList, the UE may release the DRB, the PDCP entity, and the RLC bearer corresponding to the indicated drb-identity.

When the base station does not include drb-identity in DRB-ToReleaseList, the UE may implicitly release the drb-identity corresponding to each DRB released in association with the PDCU session to release the DRB, the PDCP entity, and the RLC bearer corresponding to the released drb-identity. Accordingly, when the full configuration is set in the UE, the base station may signal the UE without including DRB-ToReleaseList in the RRCReconfiguration message or the RRCResume message.

2> Each RLC bearer associated with the released DRB or released drb-identity is released. Here, an operation of the UE releasing the RLC bearer may be performed via following two methods:

When logicalchannelIdentity is explicitly included in rlc-BearerToReleaseList, the base station may release one or more RLC entities corresponding to the logicalchannelIdentity and a corresponding logical channel.

When logicalchannelIdentity is not explicitly included in rlc-BearerToReleaseList, the base station may release one or more RLC entities corresponding to logicalchannelIdentity associated with DRB/drb-identity/PDCP entity released via the above procedure (the result of full configuration), and a corresponding logical channel. Accordingly, when the full configuration is set in the UE, the base station may signal the UE without including BearerToReleaseList in the RRCReconfiguration message or the RRCResume message.

Second Operation:

1> When drb-ToAddModList is not included in a PDU session belonging to a current UE configuration with respect to the PDU session:

2> When reconfigurationWithSync is included in the RRCReconfiguration or RRCResume message (e.g., when operation 1g-05 is performed due to handover),
3> an upper layer may be notified that user plane resources regarding the PDU session are released after a successful reconfiguration with sync procedure or after a successful handover procedure. This is because, when the upper layer is notified that the user plane resources regarding the PDU session are released before the successful reconfiguration with sync procedure or before the successful handover procedure, there is a risk that an NAS message may be transmitted to an AS before the procedure.
2> Otherwise,
3> The upper layer may be immediately notified that the user plane resources regarding the PDU session are released. The above procedure may be identically applied when the full configuration is not triggered and the RRCReconfiguration message or the RRCResume message is received from the base station.

A UE operation suggested in operation 1g-15 when the UE 1g-01 receives CellGroupConfig IE via the RRCReconfiguration message or the RRCResume message from the gNB 1g-02 is as follows:

Third Operation:
1> When spCellConfig IE including reconfigurationWithSync in CellGroupConfig is received,
2> A reconfiguration with sync procedure is performed, all suspended radio bearers may be resumed, and SCG transmission may be resumed for all radio bearers (when suspended).
1> When rlc-BearerToReleaseList IE is received in CellGroupConfig,
2> An RLC bearer releasing procedure may be performed.
1> When rlc-BearerToAddMdList IE is received via CellGroupConfig,
2> An RLC bearer adding and modifying procedure may be performed.
1> When mac-CellGroupConfig IE is received via CellGroupConfig,
2> An MAC entity may be configured for a corresponding cell group.
1> When sCellToReleaseList is received via CellGroupConfig,
2> An Scell releasing procedure may be performed.
1> When spCellConfig is received via CellGroupConfig,
2> SpCell may be configured.
1> When sCellToAddModList is received via CellGroupConfig,
2> An Scell adding and modifying procedure may be performed.

A UE operation suggested in operation 1g-20 when the UE 1g-01 receives radioBearerConfig IE via the RRCReconfiguration message or the RRCResume message from the gNB 1g-02 is as follows:

Fourth Operation:
1> When srb3-ToRelease is included in RadioBearerConfig and configured to be true,
2> An SRB3 releasing procedure may be performed.
1> When srb-ToAddModList IE is received via CellGroupConfig,
2> An SRB adding or reconfiguring procedure may be performed.
1> When drb-ToReleaseList is received via CellGroupConfig,
2> A DRB releasing procedure may be performed.
1> When drb-ToAddModList is received via CellGroupConfig,
2> A DRB adding or reconfiguring procedure may be performed.
1> When there is no DRB associated with all SDAP entities, the SDAP entities may be released.
2> When the releasing procedure is triggered upon receiving reconfigurationWithSync,
3> The upper layer may be instructed that the user plane resource is released after the successful reconfiguration with sync procedure or successful handover procedure with respect to the PDU sessions associated with the released SDAP entities.
2> Otherwise,
3> The upper layer may be immediately instructed that the user plane resource is released with respect to the PDU sessions associated with the released SDAP entities. For reference, the above procedure may be identically applied when the full configuration is not triggered and the RRCReconfiguration message or the RRCResume message is received from the base station.

Figure 1H:
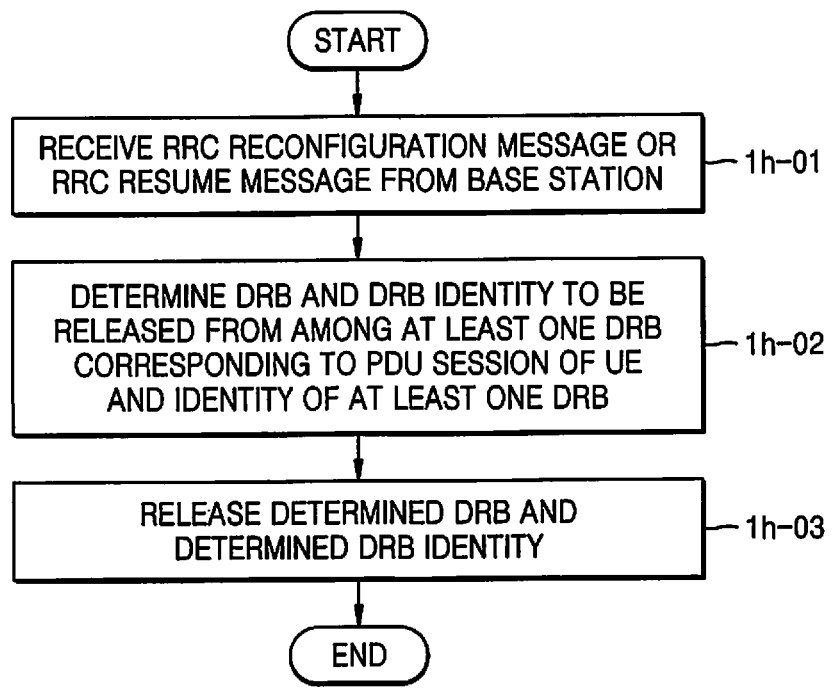
FIG. 1H is a flowchart illustrating operations of a UE, according to an embodiment.

FIG. 1H is a flowchart illustrating operations of a UE, according to an embodiment.

Referring to FIG. 1H, in step 1h-01, the UE receives an RRC reconfiguration message or an RRC resume message from a base station.

In step 1h-02, the UE determines a DRB and a DRB identity to be released from among at least one DRB corresponding to a PDU session of the UE and an identity of the at least one DRB.

In step 1h-03, the UE releases the determined DRB and the determined DRB identity.

Figure 1I:
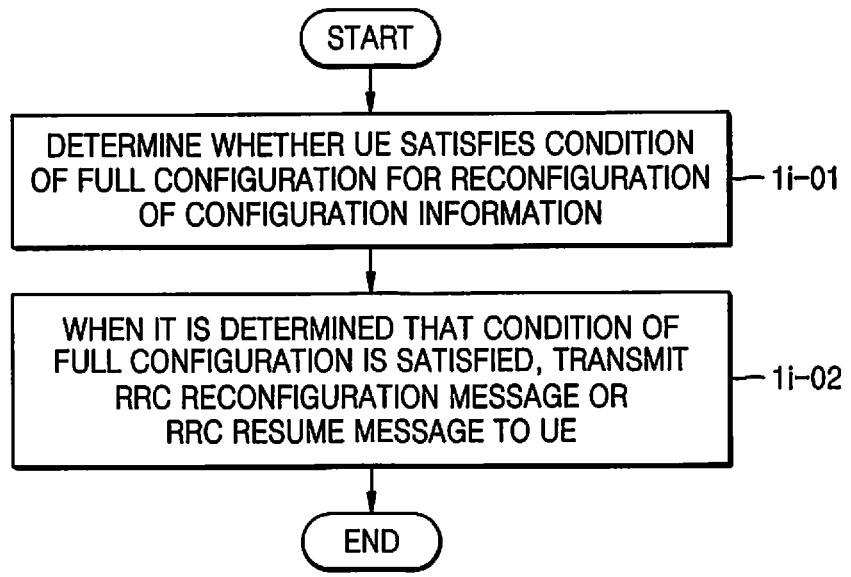
FIG. 1I is a flowchart illustrating operations of a base station, according to an embodiment.

FIG. 1I is a flowchart illustrating operations of a base station, according to an embodiment.

Referring to FIG. 1I, in step 1i-01, the base station determines whether a UE satisfies a condition of full configuration for reconfiguration of configuration information.

In step 1i-01, when it is determined that the condition of full configuration is satisfied, the base station transmits an RRC reconfiguration message or an RRC resume message to the UE. A DRB and a DRB identity released from the UE may be determined according to information included in the RRC reconfiguration message or the RRC resume message.

Figure 2A:
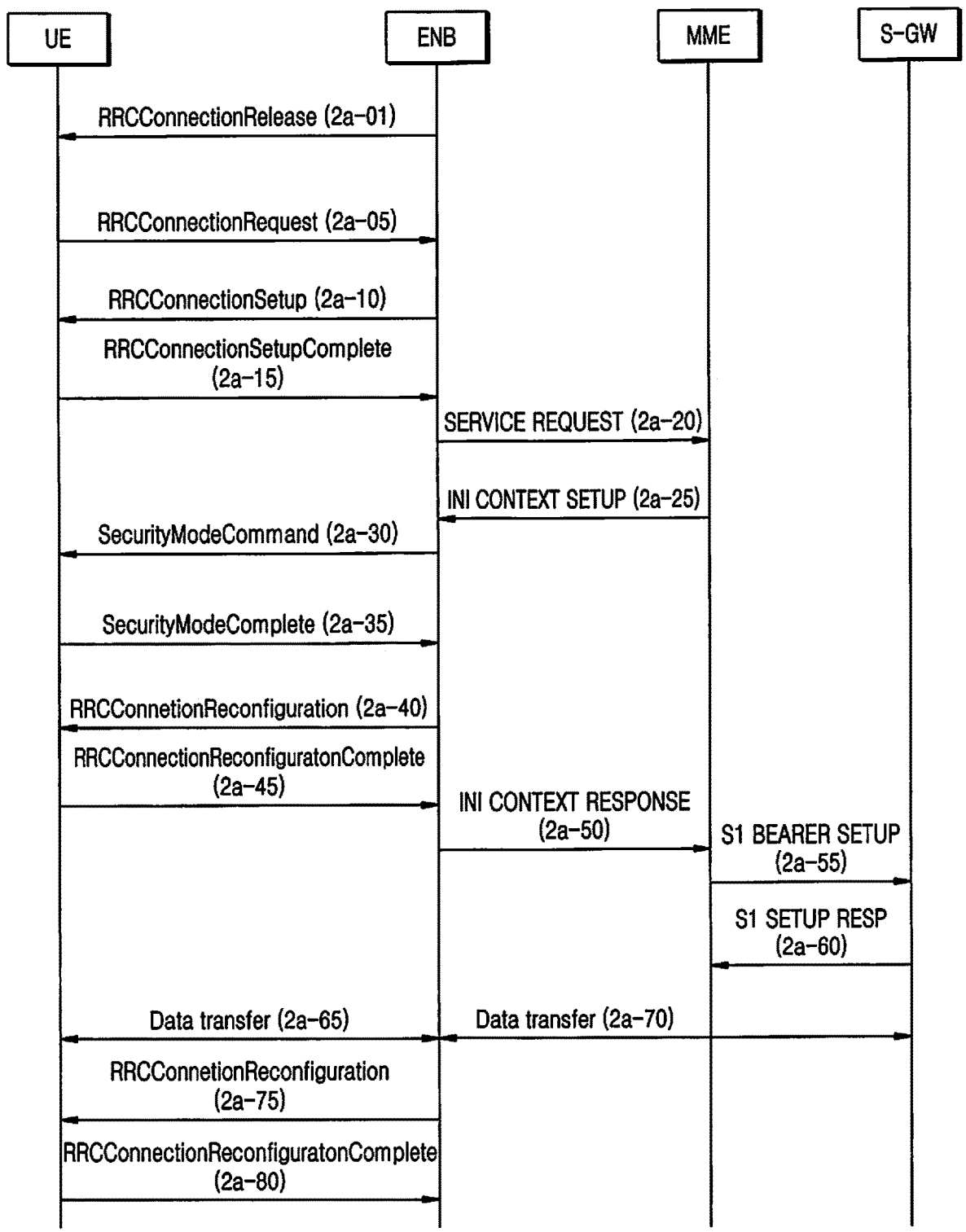
FIG. 2A is a signal flow diagram illustrating procedures in which a UE switches from an RRC connected mode to an RRC idle mode when an eNB releases a connection with the UE, and procedures in which the UE establishes a connection with the eNB to switch from the RRC idle mode to the RRC connected mode, according to an embodiment.

FIG. 2A is a signal flow diagram illustrating procedures in which, when an eNB releases a connection with a UE, the UE switches an RRC connected mode to an RRC idle mode and procedures in which the UE establishes a connection with the eNB to switch the RRC idle mode to the RRC connected mode, according to an embodiment.

Referring to FIG. 2A, when the UE that transmits or receives data in the RRC connected mode does not transmit or receive data for a certain reason or for a certain time, the eNB transmits an RRCConnectionRelease message to the UE to switch to the RRC idle mode (step 2a-01). Thereafter, when data to be transmitted is generated, the UE that has not currently established a connection (hereinafter, the idle mode UE) performs an RRC connection establishment procedure with the eNB. The UE establishes reverse transmission synchronization with the eNB through a random access procedure and transmits an RRCConnectionRequest message to the eNB (step 2a-05). The RRCConnectionRequest message may include an identifier of the UE, establishment cause, etc.

The eNB transmits an RRCConnectionSetup message such that the UE establishes an RRC connection (step 2a-10). The RRCConnectionSetup message may include RRC connection configuration information or the like. RRC connection may also be referred to as an SRB and may be used during transmission and reception of an RRC message that is a control message between the UE and the eNB.

The UE that established the RRC connection transmits an RRCConnectionSetupComplete message to the eNB (step 2a-15). When there is flight path information available to the UE, the RRCConnectionSetupComplete message may include flightPathInfoAvailable. Also, the RRCConnectionSetupComplete message may include a control message such as a SERVICE REQUEST message for requesting an MME to configure a bearer for a certain service by the UE.

The eNB transmits the SERVICE REQUEST message included in the RRCConnectionSetupComplete message to the MME (step 2a-20), and the MME determines whether to provide the service requested by the UE. As a result of the determination, when the service requested by the UE is to be provided, the MME transmits an INITIAL CONTEXT SETUP REQUEST message to the eNB (step 2a-25). The INITIAL CONTEXT SETUP REQUEST message may include QoS information to be applied in configuring a DRB, security information (e.g., a security key, a security algorithm, or etc.) to be applied to the DRB, etc.

The eNB exchanges a SecurityModeCommand message (step 2a-30) and a SecurityModeComplete message (step 2a-35) with the UE to configure a security mode. After the security mode is configured, the eNB transmits an RRCConnectionReconfiguration message to the UE (step 2a-40). The RRCConnectionReconfiguration message may include configuration information about the DRB to process user data, and the UE may configure the DRB by using the configuration information and transmits an RRCConnectionReconfigurationComplete message to the eNB (step 2a-45). When there is flight path information available to the UE, the RRCConnectionReconfigurationComplete message may include flightPathInfoAvailable.

Upon completing the DRB configuration with the UE, the eNB transmits an INITIAL CONTEXT SETUP COMPLETE message to the MME (step 2a-50), and upon reception, the MME may exchange an S1 BEARER SETUP message and an S1 BEARER SETUP RESPONSE message with an S-GW to configure an S1 bearer (steps 2a-55 and 2a-60). The S1 bearer is a connection for data transmission, which is configured between the S-GW and the gNB, and corresponds to the DRB in a one-to-one manner.

After the above procedures are completed, the UE may transmit or receive data to or from the eNB through the S-GW in steps 2a-65 and 2a-70. As such, a data transmission processes may include three steps of RRC connection establishment, security setting, and DRB configuration.

Also, the eNB transmits, to the UE, an RRCConnectionReconfiguration message to renew, add, or change the configuration for a certain reason or to perform handover (step 2a-75). The UE may transmit an RRCConnectionReconfigurationComplete message to the eNB by including flightPathInfoAvailable when DRB is configured by applying information included in the RRCConnectionReconfiguration message and there is the flight path information available to the UE.

FIG. 2B is a signal flow diagram illustrating procedures in which a UE in an RRC connected mode performs measurement as an eNB or gNB provides measurement configuration applicable in the RRC connected mode to the UE, according to an embodiment.

Referring to FIG. 2B, the eNB or gNB transmits, to the UE, an RRCConnectionReconfiguration message or an RRCConnectionResume message including measurement configuration information (measConfig) applicable in the RRC connected mode (step 2b-01). The measConfig included in the message may include the following information:

1. Measurement objects: Objects to be measured by the UE. For example, the following information may be a measurement object:

When a UE accesses an LTE cell, a measurement object may denote a single evolved universal terrestrial radio access (E-UTRA) carrier frequency for measurement of an intra-frequency and an inter-frequency, and a base station may configure an offset list for each cell, a list of blacklisted cells, and a list of whitelisted cells in association with a corresponding carrier frequency. In the case of inter-RAT NR measurement, the measurement object may denote a single NR carrier frequency and the base station may configure the list of blacklisted cells in association with the corresponding carrier frequency.

When a UE accesses an NR cell, a measurement object may denote a frequency/time location to be measured and subcarrier spacing of reference signals for measurement of an intra-frequency and an inter-frequency, and a base station may configure an offset list for each cell, a list of blacklisted cells, and a list of whitelisted cells in association with a corresponding measurement object. In the case of inter-RAT E-UTRA measurement, the measurement object may denote a single E-UTRA carrier frequency and the base station may configure the offset list for each cell, the list of blacklisted cells, and the list of whitelisted cells in association with a corresponding carrier frequency. When the UE accesses an LTE cell or an NR cell, the UE may perform event evaluation or measurement reporting only on the list of whitelisted cells, but not perform event evaluation or measurement reporting on the list of blacklisted cells.

2. Reporting configurations: Reporting configuration list for transmitting a MeasurementReport message to a UE. For example, the following information may be an individual reporting configuration:

Reporting criterion: may include a condition for the UE to transmit the MeasurementReport message, and the condition may be a periodical or single event description.

Reporting format: values for the UE to include in the MeasurementReport message and information related thereto (for example, the number of cells/beams to be reported).

RS type: RS used for a beam or cell measurement result such as a synchronization signal block (SSB) or a channel state information (CSI)-RS.

3. Measurement identities: Identities for identifying measurement objects. Each identity may associate one reporting configuration with one measurement object.

4. Quantity configurations: Values to be measured by a UE and layer 3 filtering coefficients.

5. Measurement gaps: Period for a UE to measure a neighboring cell.

In step 2b-01, upon receiving the RRCConnectionReconfiguration message or the RRCConnectionResume message including measConfig, the UE may perform a series of operations as below:

When measObjectToRemoveList is included in the received measConfig, a measurement object removal procedure may be performed. The measObjectToRemoveList may include a MeasObjectID (measurement object identity) list to be removed.

When measObjectToAddModList is included in the received measConfig, a measurement object addition/modification procedure may be performed. The measObjectToAddModList may include a measObject (e.g., in the case of LTE, measObjectEUTRA) list of one of MeasObjectID and RAT to be newly added or changed.

When reportConfigToRemoveList is included in the received measConfig, a reporting configuration removal procedure may be performed. The reportConfigToRemoveList may include a ReportConfigID list to be removed.

When reportConfigToAddModList is included in the received measConfig, a reporting configuration addition/modification procedure may be performed. The reportConfigToAddModList may include a reportConfigID or reportConfig list, and reportConfig may be one of the IEs below:

reportConfigEUTRA: IE including conditions for triggering an E-UTRA measurement reporting event. For example, a base station may configure an H1 event and/or an H2 event to a UE by using the IE.

1) H1 event: (Aerial) When the height of a UE is higher than an absolute threshold.

2) H2 event: (Aerial) When the height of the UE is lower than the absolute threshold.

reportConfigInterRAT: IE including conditions for triggering an inter-RAT measurement reporting event.

When quantityConfig is included in the received measConfig, a quantity configuration procedure may be performed. The quantityConfig includes values to be measured by the UE for each RAT and layer 3 filtering coefficients. For example, QuantityConfigEUTRA IE applicable to E-UTRA measurement includes RSRP and/or RSRQ and/or CSI RSRP and/or RS-SINR filter coefficients.

When measIdToRemoveList is included in the received measConfig, a measurement identity removal procedure may be performed. The measIDRemoveList may include a MeasID (an identity used to identify a measurement configuration and connecting a measurement object and a reporting configuration) list.

When measIdToAddModList is included in the received measConfig, a measurement identity addition/modification procedure may be performed. The measIdToAddModList may include lists of MeasID, MeasObjectID, ReportConfigID (measurement reporting configuration identity) to be newly added or changed.

When the eNB or gNB configured the H1 event and/or the H2 event to the UE in operation 2*b*-01, the UE may measure the height (operation 2*f*-05). Accordingly, the UE may determine whether a measurement report is triggered with respect to the H1 event and/or the H2 event via a series of processes below.

The UE determines whether security is activated successfully (operation 2*b*-10).

Then, the UE may determine whether one of following conditions is satisfied with respect to individual measID included in measIdList present in VarMeasConfig (measurement configuration information accumulated with respect to measurements to be performed by the UE) that is an internal variable:

Condition 1: When an entering condition is satisfied with respect to eventID corresponding to reportConfig in VarMeasConfig during timeToTrigger in which a trigger type is set to an event, eventID is set to eventH1, H1Triggered that is a UE variable is set to FALSE, and VarMeasConfig is defined for eventH1 (operation 2*b*-15)

1) A variable H1Triggered newly proposed/defined is for enabling the UE not to perform the measurement reporting procedure continuously until H1Triggered is set to FALSE later, by setting a corresponding value to TRUE before/after the UE performs the measurement reporting procedure on the eNB or gNB as the UE satisfies the entering condition during timeToTrigger. This is because the H1 event is triggered based on the height of the UE, and thus, when the variable H1Triggered is not introduced, the UE may satisfy the entering condition every time during timeToTrigger. The variable is named H1Triggered and set to FALSE/TRUE as an example, and thus, the name and setting method thereof are not limited.

2) The entering condition for the eventH1 may be determined via Equation (1) below:

Inequality H1-1 (Entering condition)

$$Ms-Hys>Thresh+Offset \qquad (1)$$

Definitions of parameters used in Equation (1) may be determined based on 3GPP standard document "36.331: RRC", and the parameters may be included in the measConfig.

Condition 2: When an entering condition is satisfied with respect to an eventID corresponding to reportConfig in VarMeasConfig during timeToTrigger in which a trigger type is set to an event, eventID is set to eventH2, H2Triggered that is a UE variable is set to FALSE, and VarMeasConfig is defined for eventH2 (operation 2*b*-15).

1) A variable H2Triggered newly proposed/defined is for instructing the UE not to perform the measurement reporting procedure continuously until H2Triggered is set to FALSE later, by setting a corresponding value to TRUE when the UE performs the measurement reporting procedure on the eNB or gNB as the UE satisfies the entering condition during timeToTrigger. This is because the H2 event is triggered based on the height of the UE, and thus, when the variable H2Triggered is not introduced, the UE may satisfy the entering condition every time during timeToTrigger. In an embodiment of the disclosure, the variable is named H2Triggered and set to FALSE/TRUE as an example, and thus the name and setting method thereof are not limited.

2) The entering condition for the eventH2 may be determined via Equation (2) below:

Inequality H2-1 (Entering condition)

$$Ms+Hys<Thresh+Offset \qquad (2)$$

Definitions of parameters used in Equation (2) may be determined based on 3GPP standard document "36.331: RRC", and the parameters may be included in the measConfig.

The UE may include a measurement reporting entry in the VarMeasReportList with respect to measId satisfying the condition (Condition 1 or Condition 2) described in step 2*b*-15 (step 2*b*-20).

The UE may set numberOfReportsSent in VarMeasReportList to 0 with respect measId described in step 2*b*-20 (step 2*b*-25).

The UE may transmit a MeasurementReport message to the eNB or gNB by performing a measurement reporting procedure with respect to eventH1 or eventH2 satisfied in step 2*b*-15. The MeasurementReport message may include, when possible, information in which height coordinates of the UE and/or the height of UE is set in heightUE (step 2b-30). Also, before transmitting the MeasurementReport message, the UE may increase numberOfReportsSent by 1.

When Condition 1 is satisfied, the UE may configure H1Triggered to TRUE with respect to eventH1, or when Condition 2 is satisfied, the UE may configure H2Triggered to TRUE with respect to eventH2 (step 2b-35). Step 2b-35 may be performed before step 2b-20, step 2b-25, or step 2b-30.

The UE may determine whether one of following conditions is satisfied in step 2b-40:

Condition 3: When a leaving condition is satisfied with respect to eventID corresponding to reportConfig in VarMeasConfig during timeToTrigger in which a trigger type is set to an event, eventID is set to eventH1, H1Triggered that is a UE variable is set to TRUE, and VarMeasConfig is defined for eventH1 (step 2b-40)

2) The leaving condition for the eventH1 may be determined via Equation (3) below:

Inequality H1-2 (Leaving condition)

$$Ms+Hys<Thresh+Offset \quad (3)$$

Definitions of parameters used in Equation (3) may be determined based on 3GPP standard document "36.331: RRC", and the parameters may be included in the measConfig.

Condition 4: When a leaving condition is satisfied with respect to eventID corresponding to reportConfig in VarMeasConfig during timeToTrigger in which a trigger type is set to an event, eventID is set to eventH2, H2Triggered that is a UE variable is set to TRUE, and VarMeasConfig is defined for eventH2 (step 2b-40)

2) The leaving condition for the eventH2 may be determined via Equation (4) below:

Inequality H2-2 (Leaving condition)

$$Ms-Hys>Thresh+Offset \quad (4)$$

Definitions of parameters used in Equation (4) may be determined based on 3GPP standard document "36.331: RRC", and the parameters may be included in the measConfig.

When one of the above conditions is satisfied in step 2b-40, the UE may perform the measurement reporting procedure and transmit the MeasurementReport message to the eNB or gNB, when reportOnLeave is set to be TRUE in reporting configuration corresponding to the event (eventH1 or eventH2). The MeasurementReport message may include, when possible, information in which height coordinates of the UE and/or the height of UE is set in heightUE. Before transmitting the MeasurementReport message, the UE may increase numberOfReportsSent by 1. When reportOnLeave is set to FALSE or is not present with respect to eventH1 and/or eventH2, the UE may not perform the measurement reporting procedure but immediately perform step 2b-50 (step 2b-45).

The UE may set H1Triggered to FALSE in the case of eventH1 or set H2Triggered to FALSE in the case of eventH2 (step 2b-50). Step 2b-50 may be performed before step 2b-45.

Figure 2C:
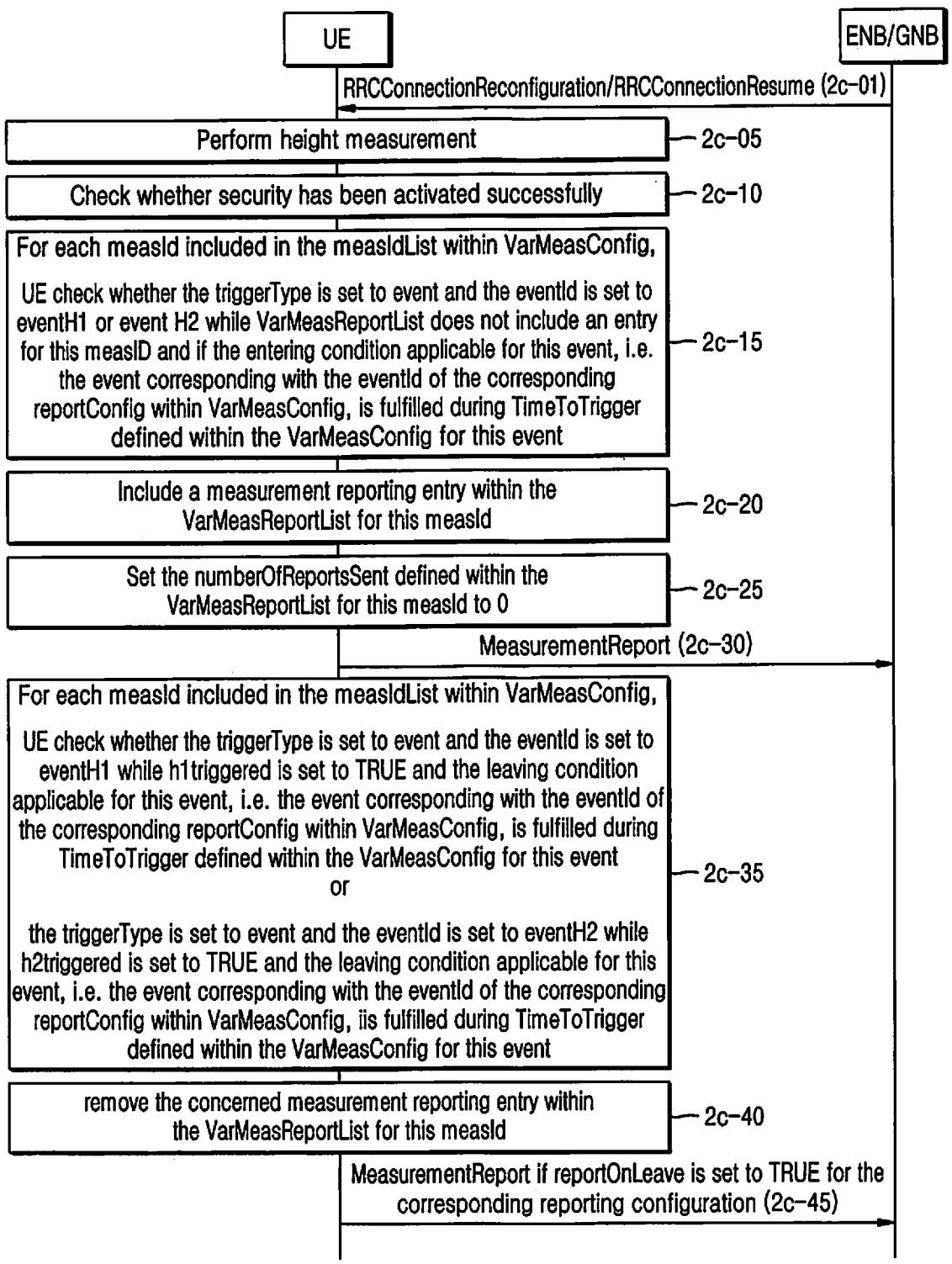
FIG. 2C is a signal flow diagram illustrating procedures in which a UE in an RRC connected mode performs measurement when an eNB or gNB provides measurement configuration applicable in the RRC connected mode to the UE, according to an embodiment.

FIG. 2C is a signal flow diagram illustrating procedures in which a UE in an RRC connected mode performs measurement when an eNB or gNB provides measurement configuration applicable in the RRC connected mode to the UE, according to an embodiment.

Referring to FIG. 2C, the eNB or gNB transmits, to the UE, an RRCConnectionReconfiguration message or an RRCConnectionResume message including measurement configuration information (measConfig) applicable in the RRC connected mode (step 2c-01). The measConfig included in the message may include following information:

1. Measurement objects: Objects to be measured by the UE. For example, the following information may be a measurement object:

When a UE accesses an LTE cell, a measurement object may denote a single E-UTRA carrier frequency for measurement of an intra-frequency and an inter-frequency, and a base station may configure an offset list for each cell, a list of blacklisted cells, and a list of whitelisted cells in association with a corresponding carrier frequency. In the case of inter-RAT NR measurement, the measurement object may denote a single NR carrier frequency and the base station may configure the list of blacklisted cells in association with the corresponding carrier frequency.

When a UE accesses an NR cell, a measurement object may denote a frequency/time location to be measured and subcarrier spacing of reference signals for measurement of an intra-frequency and an inter-frequency, and a base station may configure an offset list for each cell, a list of blacklisted cells, and a list of whitelisted cells in association with a corresponding measurement object. In the case of inter-RAT E-UTRA measurement, the measurement object may denote a single E-UTRA carrier frequency and the base station may configure the offset list for each cell, the list of blacklisted cells, and the list of whitelisted cells in association with a corresponding carrier frequency. When the UE accesses an LTE cell or an NR cell, the UE may perform event evaluation or measurement reporting only on the list of whitelisted cells, but not perform event evaluation or measurement reporting on the list of blacklisted cells.

2. Reporting configurations: Reporting configuration list for transmitting a MeasurementReport message to a UE. For example, the following information may be an individual reporting configuration:

Reporting criterion: a condition for the UE to transmit the MeasurementReport message, and the condition may be a periodical or single event description.

Reporting format: values for the UE to include in the MeasurementReport message and information related thereto (e.g., the number of cells/beams to be reported).

RS type: RS used for a beam or cell measurement result such as SSB or CSI-RS.

3. Measurement identities: Identities for identifying measurement objects. Each identity may associate one reporting configuration with one measurement object.

4. Quantity configurations: Values to be measured by a UE and layer 3 filtering coefficients.

5. Measurement gaps: Period for a UE to measure a neighboring cell.

In step 2c-01, upon receiving the RRCConnectionReconfiguration message or the RRCConnectionResume message including measConfig, the UE may perform a series of operations as below:

When measObjectToRemoveList is included in the received measConfig, a measurement object removal procedure may be performed. The measObject- ToRemoveList may include a MeasObjectID (measurement object identity) list to be removed.

When measObjectToAddModList is included in the received measConfig, a measurement object addition/modification procedure may be performed. The measObjectToAddModList may include a measObject (e.g., in the case of LTE, measObjectEUTRA) list of one of MeasObjectID and RAT to be newly added or changed.

When reportConfigToRemoveList is included in the received measConfig, a reporting configuration removal procedure may be performed. The reportConfigToRemoveList may include a ReportConfigID list to be removed.

When reportConfigToAddModList is included in the received measConfig, a reporting configuration addition/modification procedure may be performed. The reportConfigToAddModList may include a reportConfigID or reportConfig list, and reportConfig may be one of the IEs below:

reportConfigEUTRA: IE including conditions for triggering an E-UTRA measurement reporting event. For example, the IE may enable a base station to configure an H1 event and/or an H2 event to a UE.

1) H1 event: (Aerial) When the height of a UE is higher than an absolute threshold.

2) H2 event: (Aerial) When the height of the UE is lower than the absolute threshold.

reportConfigInterRAT: IE including conditions for triggering an inter-RAT measurement reporting event.

When quantityConfig is included in the received measConfig, a quantity configuration procedure may be performed. The quantityConfig includes values to be measured by the UE for each RAT and layer 3 filtering coefficients. For example, QuantityConfigEUTRA IE applicable to E-UTRA measurement may include RSRP and/or RSRQ and/or CSI RSRP and/or RS-SINR filter coefficients.

When measIdToRemoveList is included in the received measConfig, a measurement identity removal procedure may be performed. The measIDRemoveList may include a MeasID (an identity used to identify a measurement configuration and connecting a measurement object and a reporting configuration) list.

When measIdToAddModList is included in the received measConfig, a measurement identity addition/modification procedure may be performed. The measIdToAddModList may include lists of MeasID, MeasObjectID, ReportConfigID (measurement reporting configuration identity) to be newly added or changed.

When the eNB or gNB configured the H1 event and/or the H2 event to the UE in step 2c-01, the UE may measure the height (step 2c-05). The UE may determine whether a measurement report is triggered with respect to the H1 event and/or the H2 event via a series of processes below:

The UE determines whether security is activated successfully (step 2c-10).

The UE may determine whether one of following conditions is satisfied with respect to individual measID included in measIdList present in VarMeasConfig (measurement configuration information accumulated with respect to measurements to be performed by the UE) that is an internal variable.

Condition 1: When an entering condition is satisfied with respect to eventId corresponding to reportConfig in VarMeasConfig during timeToTrigger in which a trigger type is set to an event, eventId is set to eventH1, entry is not included in measID for VarMeasReportList, and VarMeasConfig is defined for eventH1 (step 2c-15)

1) Condition 1 is not satisfied when entry is included in measID for VarMeasReportList. This is to enable the UE not to continuously perform a measurement reporting procedure.

2) The entering condition for the eventH1 may be determined via Equation (5) below:

Inequality H1-1 (Entering condition)

$$Ms - Hys > Thresh + Offset \qquad (5)$$

Definitions of parameters used in Equation (5) may be determined based on 3GPP standard document "36.331: RRC", and the parameters may be included in the measConfig.

Condition 2: When an entering condition is satisfied with respect to eventId corresponding to reportConfig in VarMeasConfig during timeToTrigger in which a trigger type is set to an event, eventId is set to eventH2, entry is not included in measID for VarMeasReportList, and VarMeasConfig is defined for eventH2 (operation 2c-15)

1) Condition 2 is not satisfied when entry is included in measID for VarMeasReportList. This is to enable the UE not to continuously perform a measurement reporting procedure.

2) The entering condition for the eventH2 may be determined via Equation (6) below:

Inequality H2-1 (Entering condition)

$$Ms + Hys < Thresh + Offset \qquad (6)$$

Definitions of parameters used in Equation (6) may be determined based on 3GPP standard document "36.331: RRC", and the parameters may be included in the measConfig.

The UE may include a measurement reporting entry in the VarMeasReportList with respect to measId satisfying the condition (Condition 1 or Condition 2) described in step 2c-15 (step 2c-20).

The UE may set numberOfReportsSent in VarMeasReportList to 0 with respect to measId described in step 2c-20 (step 2c-25).

The UE may transmit a MeasurementReport message to the eNB or gNB by performing a measurement reporting procedure with respect to eventH1 or eventH2 satisfied in step 2c-15. The MeasurementReport message may include, when possible, information in which height coordinates of the UE and/or the height of UE is set in heightUE (step 2c-30). Before transmitting the MeasurementReport message, the UE may increase numberOfReportsSent by 1.

The UE may determine whether one of following conditions is satisfied in operation 2c-35.

Condition 3: When a leaving condition is satisfied with respect to eventId corresponding to reportConfig in VarMeasConfig during timeToTrigger in which a trigger type is set to an event, eventId is set to eventH1, entry is included in measID for VarMeasReportList, and VarMeasConfig is defined for eventH1 (step 2c-35)

2) The leaving condition for the eventH1 may be determined via Equation (7) below:

Inequality H1-2 (Leaving condition)

$$Ms + Hys < Thresh + Offset \qquad (7)$$

Definitions of parameters used in Equation 3 may be determined based on 3GPP standard document "36.331: RRC", and the parameters may be included in the measConfig.

Condition 4: When a leaving condition is satisfied with respect to eventId corresponding to reportConfig in VarMeasConfig during timeToTrigger in which a trigger type is set to an event, eventId is set to eventH2, entry is included in measID for VarMeasReportList, and VarMeasConfig is defined for eventH2 (step 2c-35)

2) The leaving condition for the eventH2 may be determined via Equation (8) below:

Inequality H2-2 (Leaving condition)

$$Ms - Hys > Thresh + Offset \quad (8)$$

In step 2d-10, the UE receives an RRC release message (RRCRelease) from the NR base station. The RRCRelease may not include suspended configuration information (suspendConfig). The RRCRelease may include cell reselection priority configuration information (cellReselectionPriorities). The cellReselectionPriorities may include at least one of following:

freqPriorityListEUTRA: One or more LTE frequencies and corresponding priority value(s)

freqPriorityListNR: One or more NR frequencies and corresponding priority value(s)

t320: t320 timer value

```
CellReselectionPrioriies ::=      SEQUENCE {
    freqPriorityListEUTRA              FreqPriorityListEUTRA
OPTIONAL,    -- Need M
    freqPriorityListNR                 FreqPriorityListNR
OPTIONAL,    -- Need M
    t320                               ENUMERATED (min5, min10, min20, min30, min60, min120, min180,
spare1}      OPTIONAL,   -- Need R
    ...
}
PagingCycle ::=                    ENUMERATED <rf32, rf64, rf128, rf256}
FreqPriorityListEUTRA ::=             SEQUENCE (SIZE (1..maxFreq)) OF FreqPriorityEUTRA
FreqPriorityListNR ::=                SEQUENCE (SIZE (1..maxFreq)) OF FreqPriorityNR
FreqPriorityEUTRA ::=              SEQUENCE {
    carrierFreq                        ARFCN-ValueEUTRA,
    cellReselectionPriority            CellReselectionPriority,
    cellReselectionSubPriority           CellReselectionSubPriority
OPTIONAL    -- Need R
}
FreqPriorityNR ::=                 SEQUENCE {
    carrierFreq                        ARFCN-ValueNR,
    cellReselectionPriority            CellReselectionPriority,
    cellReselectionSubPriority           CellReselectionSubPriority
OPTIONAL    -- Need R
}
```

Definitions of parameters used in Equation (8) may be determined based on 3GPP standard document "36.331: RRC", and the parameters may be included in the measConfig.

When one of the conditions described in step 2c-40 is satisfied, the UE may remove a measurement reporting entry included in VarMeasReportList for the measID.

When reportOnLeave is set to TRUE in a reporting configuration corresponding to the event (eventH1 or eventH2) in step 2c-45, the measurement reporting procedure may be performed to transmit a MeasurementReport message to the eNB or gNB. The MeasurementReport message may include, when possible, information in which height coordinates of the UE and/or the height of UE is set in heightUE. Before transmitting the MeasurementReport message, the UE may increase numberOfReportsSent by 1.

Figure 2D:
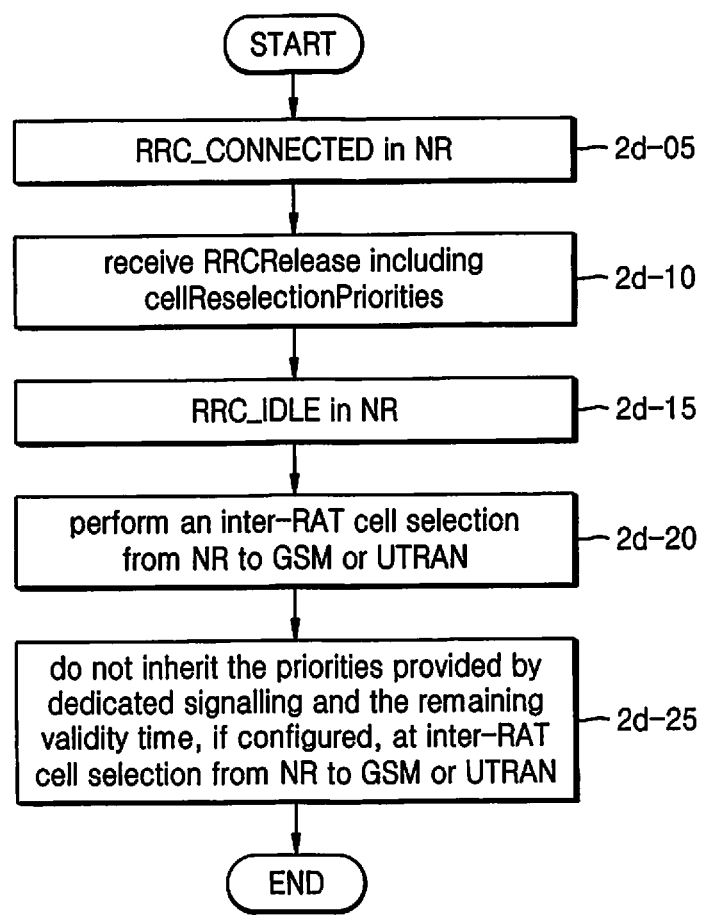
FIG. 2D is a flowchart illustrating a procedure in which a UE switches an RRC connected mode to an RRC idle mode when a base station releases a connection with the UE and operations of the UE when the UE selects a global system for mobile communications (GSM) or universal mobile telecommunications system (UMTS) terrestrial radio access network (UTRAN) cell in the RRC idle mode, according to an embodiment.

FIG. 2D is a flowchart illustrating a procedure in which a UE switches an RRC connected mode to an RRC idle mode when a base station releases a connection with the UE, when the UE selects a global system for mobile communications (GSM) or UTRAN cell in the RRC idle mode, according to an embodiment.

Referring to FIG. 2D, in step 2d-05, the UE is in the RRC connected mode after establishing an RRC connection with an NR base station.

In step 2d-15, the UE transitions to the RRC idle mode, and then the UE applies information configured in step 2d-10. For example, the UE may drive a t320 timer and perform a cell reselection or cell selection process based on the configured cellReselectionPriorities.

In step 2d-20, the UE performs inter-RAT cell selection for a GSM or UTRAN cell from NR during the RRC idle mode.

In step 2d-25, when the GSM or UTRAN cell is selected, the UE may not inherit cellReselectionPriorities and remaining validity time configured dedicatedly from the NR base station in step 2d-10. Alternatively, the UE may inherit cellReselectionPriorities and the validity time regarding LTE and may not inherit cellReselectionPriorities regarding NR.

Figure 3A:
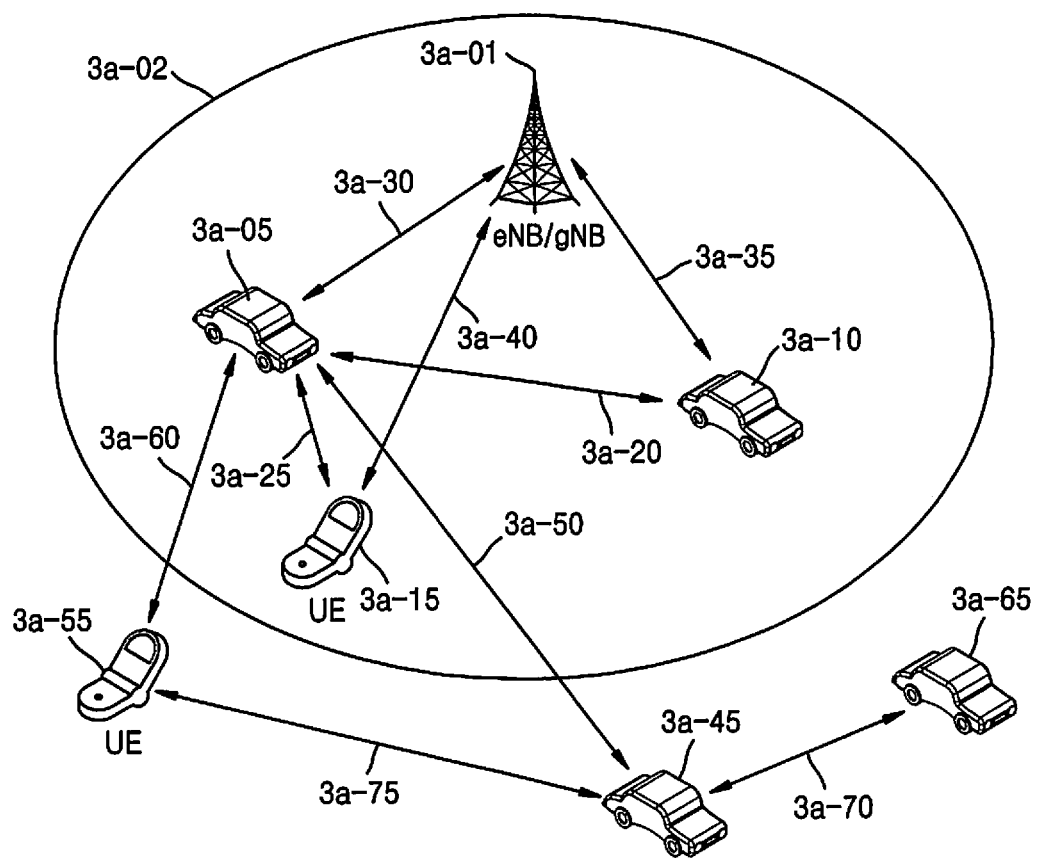
FIG. 3A illustrates vehicle-to-everything (V2X) communication in a mobile communication system, according to an embodiment.

FIG. 3A illustrates vehicle-to-everything (V2X) communication in a mobile communication system, according to an embodiment.

Herein, V2X collectively denotes communication technology with a vehicle via all interfaces, and may include vehicle-to-vehicle (V2V), vehicle-to-infrastructure (V2I), vehicle-to-pedestrian (V2P), and vehicle-to-network (V2N) based on a type thereof and components performing communication.

Referring to FIG. 3A, an eNB/gNB 3a-01 may include at least one of vehicle terminal 3a-05 or 3a-10 or a pedestrian mobile terminal 3*a*-15 located within a cell 3*a*-02 supporting V2X. V2X is supportable via an UMTS air (Uu) interface. For example, the vehicle terminals 3*a*-05 and 3*a*-10 may perform cellular communication with the eNB/gNB 3*a*-01 by using vehicle terminal-base station UUDL 3*a*-30 and 3*a*-35, and the pedestrian mobile terminal 3*a*-15 may perform cellular communication with the eNB/gNB 3*a*-01 by using pedestrian terminal-base station UUDL 3*a*-50.

V2X may be supported via a PC5 interface. V2X via the PC5 interface may perform V2X sidelink (SL) communication by using terminal-terminal SL 3*a*-20 or 3*a*-25. For example, the vehicle terminal 3*a*-05 in coverage of E-UTRA/NR may transmit or receive a V2X data packet, based on a resource assignment mode (scheduled resource assignment or UE autonomous resource selection) or a preconfiguration resource, via SL 3*a*-20, 3*a*-50, 3*a*-25, or 3*a*-60 that is a transmission channel with another vehicle terminal 3*a*-10 or 3*a*-45 or pedestrian mobile terminal 3*a*-15 or 3*a*-55.

Scheduled resource assignment (mode 1 or mode 3) may include a method by which a base station assigns a resource used in SL transmission in a dedicated scheduling manner, to RRC-connected terminals. The scheduled resource assignment may be effective in interference management and management of a resource pool (dynamic assignment, semi-persistence transmission, etc.) because the base station is able to manage resources of SL. When there is data to be transmitted to other UE(s), a UE in an RRC connected mode may transmit, to the base station, information indicating that there is data to be transmitted to the other UE(s) by using an RRC message or an MAC control element (CE). For example, the RRC message may include a SidelinkUEInformation or UEAssistanceInformation message, and the MAC CE may include buffer state report MAC CE of a new format (including at least an indicator notifying a buffer state report for V2X communication and information about a size of data buffered for SL communication).

UE autonomous resource selection (mode 2 or mode 4) may be a method by which a base station provides an SL transmission and reception resource pool for V2X to a UE via system information or RRC message (e.g., an RRCReconfiguration message or PC5-RRC message) and the UE selects a resource pool according to a determined rule. The UE autonomous resource selection may belong to one or more modes among following resource assignment modes:

UE autonomously selects sidelink resource for transmission

UE assists sidelink resource selection for other UEs

UE is configured with NR configured grant for sidelink transmission

UE schedules sidelink transmission of other UEs

A resource selecting method of a UE may include zone mapping, sensing-based resource selection, and random selection.

Even in coverage of E-UTRA/NR, a UE may be unable to perform scheduled resource assignment or UE autonomous resource selection, and in this case, the UE may perform V2X SL communication via a pre-configured SL transmission and reception resource pool (Preconfiguration resource). For example, the Preconfiguration resource may refer to v2x-CommRxPoolList in SL-V2X-Preconfiguration and/or v2x-CommTxPoolList or p2x-CommTxPoolList in SL-V2X-Preconfiguration.

The vehicle terminal 3*a*-45 out-of-coverage of E-UTRA/NR may perform V2X SL communication with the other vehicle terminal 3*a*-65 or the pedestrian mobile terminal 3*a*-55, based on the SL Preconfiguration resource via SL 3*a*-70 or 3*a*-75.

Because LTE is designed mainly targeting a basic safety service, LTE SL communication is designed such that one UE performs a procedure of separately establishing a session with another specific UE or is supported only through a broadcast transmission type without performing an SL connection establishment procedure. However, the V2X SL communication may be designed to provide the basic safety service, as well as various improved services (e.g., an autonomous driving service, a platooning service, a remote driving service, and in-vehicle infotainment) in a next-generation mobile communication (NR). Accordingly, NR V2X SL communication may be designed to support a broadcast transmission type, and also a unicast and/or groupcast transmission type.

Figure 3B:
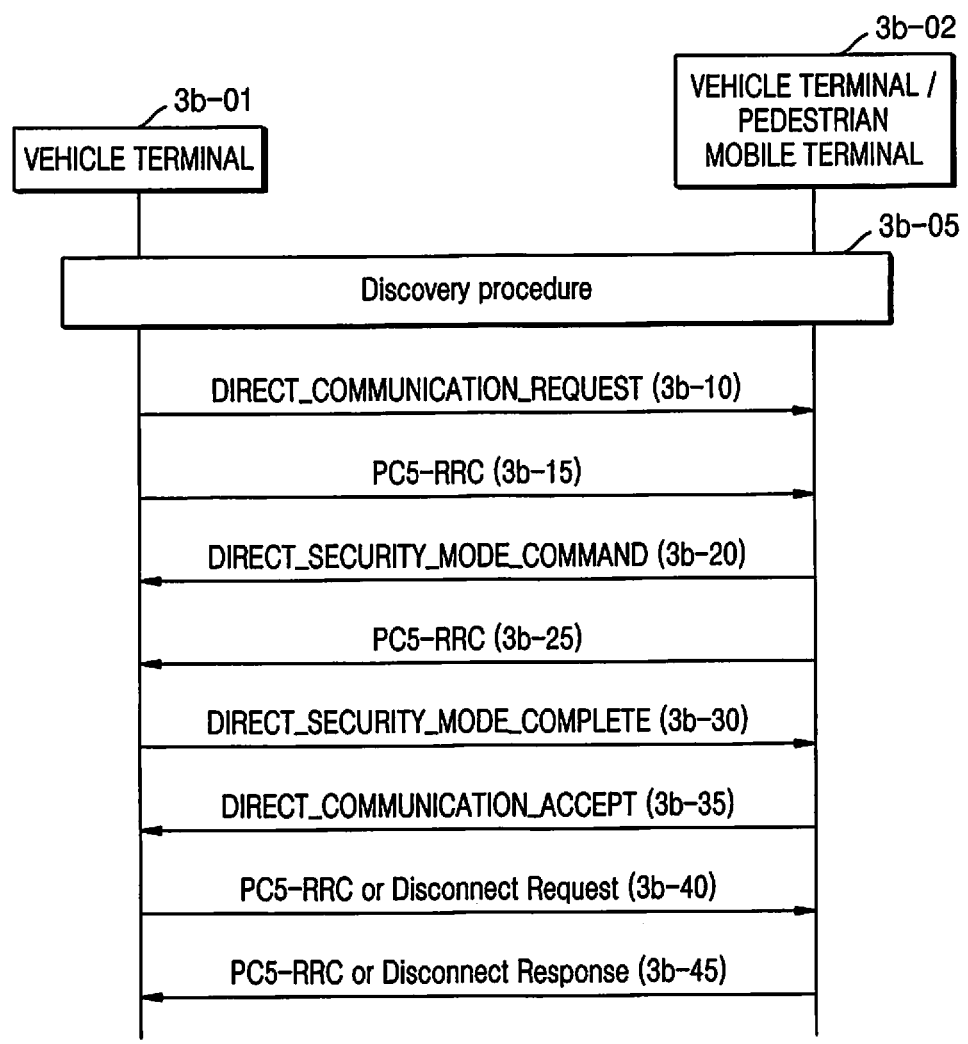
FIG. 3B is a signal flow diagram illustrating a unicast link establishment procedure for new radio (NR) V2X sidelink (SL) support, according to an embodiment.

FIG. 3B is a signal flow diagram illustrating a unicast link establishment procedure for NR V2X SL support, according to an embodiment.

Referring to FIG. 3B, a vehicle terminal 3*b*-01 performs a discovery procedure in step 3*b*-05 with another vehicle terminal or pedestrian mobile terminal 3*b*-02 to establish a unicast link. Accordingly, a destination layer 2 ID (or destination ID for a target UE) of the other vehicle terminal or pedestrian mobile terminal 3*b*-02 for NR V2X SL may be obtained.

The vehicle terminal 3*b*-01 performs an upper layer connection establishment procedure by transmitting a DIRECT_COMMUNICATION_REQUEST message to the other vehicle terminal or pedestrian mobile terminal 3*b*-02, in step 3*b*-10. The DIRECT_COMMUNICATION_REQUEST message may be a PC5 signaling message generated in a PC5-signalling protocol.

The vehicle terminal 3*b*-01 performs an AS layer connection establishment procedure by transmitting a PC5-RRC message to the other vehicle terminal or pedestrian mobile terminal 3*b*-02, in step 3*b*-15. Herein, a point of time when the PC5-RRC message is transmitted in operation 3*b*-15 is proposed. The PC5-RRC message may be:

transmitted simultaneously with a DIRECT_COMMUNICATION_REQUEST message, transmitted by being multiplexed with the DIRECT_COMMUNICATION_REQUEST message, transmitted after the DIRECT_COMMUNICATION_REQUEST message is transmitted, transmitted after the DIRECT_SECURITY_MODE_COMMAND message is received, transmitted simultaneously with a DIRECT_SECURITY_MODE_COMPLETE message, transmitted by being multiplexed with the DIRECT_SECURITY_MODE_COMPLETE message, transmitted after the DIRECT_SECURITY_MODE_COMPLETE message is transmitted, or transmitted after the DIRECT_COMMUNICATION_ACCEPT message is received.

The message may include some or all of pieces of information below as the RC5 RRC message of step 3*b*-15 generated via RRC.

An indicator or IE indicating whether to use a reconfiguration transmission resource pool and/or reception resource pool:

Through the indicator or IE, two UEs determine whether to use the Preconfiguration transmission resource pool and/or reception resource pool or to use a separate transmission/reception pool based on a resource assignment mode (scheduled resource assignment (mode 1 or mode 3) and/or UE autonomous resource selection (mode 2 or mode 4)) when transmitting and receiving V2X data packets via NR V2X SL unicast. For example, the indicator or IE may be represented in a form of TRUE/FALSE or BOOLEAN or in a form of INTEGER or ENUMERATED.

The Preconfiguration transmission resource pool may denote v2x-CommTxPoolList or p2x-CommTxPoolList included in SL-V2X-Preconfiguration IE, and the Preconfiguration reception resource pool may denote v2x-CommRxPoolList included in SL-V2X-Preconfiguration IE.

An indicator or IE indicating that a link is established for a purpose of one-to-one (unicast) and/or one-to-relay (unicast) and/or one-to-many (groupcast and/or multicast and/or broadcast):

Through the indicator or IE, it is determined that NR V2X SL communication is to be performed between two UEs through one-to-one unicast. For example, the indicator or IE may be represented in a form of INTEGER or ENUMERATED.

IE related to 5G QoS indicator (5QI) or V2X QoS indicator (VQI) indicating QoS-related information:

Through the IE, QoS information that is used for a desired V2X service during NR V2X SL communication may be indicated via unicast between two UEs. For example, the IE may include a list of 5QI or VQI.

IE including prose per-packet priority (PPPP) and/or prose per-packet reliability (PPPR) indicating QoS-related information or traffic pattern information:

Through the IE, QoS information that used for a desired V2X service during NR V2X SL communication may be indicated via unicast between two UEs. For example, the IE may include PPPPInfoSL and/or reliabilityInfoListSL and/or SL-V2X-PacketDuplicationConfig and/or trafficPatternInfoListSL.

Partial resource pool information IE among Preconfiguration transmission resource pool and/or reception resource pool:

Through the IE, two UEs may perform NR V2X SL communication via unicast by using a partial resource pool among the Preconfiguration transmission resource pool and/or reception resource pool. For example, the IE may be transmission resource pool v2x-CommTxPoolList or p2x-CommTxPoolList and/or v2x-CommRxPoolList or reception resource pool v2x-CommTxPoolList included in SL-V2X-Preconfiguration.

IE including separate SL transmission/reception resource pool information through resource assignment mode (scheduled resource assignment (mode 1 or mode 3) or UE autonomous resource selection (mode 2 or mode 4):

When the IE is included, two UEs may determine that NR V2X SL communication is to be performed via unicast by using a separate transmission/reception resource pool included in the IE. For example, the separate SL transmission/reception resource pool may denote partial or entire transmission/reception resource pool included in system information or RRCReconfiguration message.

When the IE is empty (absent), the two UEs may implicitly determine that NR V2X SL communication is to be performed via unicast by using the Preconfiguration transmission resource and/or reception resource.

V2X Tx Profile List IE supported by vehicle terminal 3f-01:

Through the IE, a UE may indicate a supported transmission format (for example, Rel-15, Rel-16, or Rel-17).

Through the IE, QAM, MAC table or the like supported by the UE may be indicated.

New timer:

The timer may be driven when a PC5-RRC message is transmitted.

The timer may stop when the PC5-RRC message is received from the other vehicle terminal or pedestrian mobile terminal 3b-02.

When the PC5-RRC message is not received from the other vehicle terminal or pedestrian mobile terminal 3b-02 until the timer expires, an AS layer may notify an upper layer that an AS layer connection establishment procedure failed. Here, the A layer may also notify a reason why the AS layer connection establishment procedure failed.

When the upper layer is notified that the AS layer connection establishment procedure failed from the AS layer, the upper layer may release a unicast link established or to be established without a separate signaling procedure. Alternatively, to release the unicast link established or to be established, the upper layer may transmit a PC5 signaling message generated in PC5-Signaling protocol to the other vehicle terminal or pedestrian mobile terminal 3b-02. For example, the PC5 signaling message may be a disconnect request message.

When the PC5-RRC message is not received from the other vehicle terminal or pedestrian mobile terminal 3b-02 until the timer expires, the upper layer may transmit the PC5-RRC message (for example, PC5-RRC Release) for releasing the unicast link established or to be established, to the other vehicle terminal or pedestrian mobile terminal 3b-02.

When the PC5-RRC message is not received from the other vehicle terminal or pedestrian mobile terminal 3b-02 until the timer expires, the vehicle terminal 3b-01 may retransmit the PC5-RRC message to the other vehicle terminal or pedestrian mobile terminal 3b-02.

Upon receiving the DIRECT_COMMUNICATION_REQUEST message in step 3b-10, the other vehicle terminal or pedestrian mobile terminal 3b-02 may perform a direct security mode control procedure by transmitting a DIRECT_SECURITY_MODE_COMMAND message to the vehicle terminal 3b-01 in step 3b-20. The DIRECT_SECURITY-MODE_COMMAND message may be a PC5 signaling message generated in the PC5-Signalling protocol.

When the other vehicle terminal or pedestrian mobile terminal 3b-02 received the PC5-RRC message from the vehicle terminal 3b-01, the other vehicle terminal or pedestrian mobile terminal 3b-02 may transmit the PC5-RRC message to the vehicle terminal 3b-01 in response (step 3b-25). In the disclosure, a point of time when the PC5-RRC message is transmitted in operation 3b-25 is proposed. The PC5-RRC message may be:

transmitted immediately after the PC5-RRC message is received in operation 3b-15, transmitted before the DIRECT_SECURITY_MODE_COMMAND message is transmitted, transmitted simultaneously with a DIRECT_SECU-
RITY_MODE_COMMAND message,
transmitted by being multiplexed with the DIRECT_SE-
CURITY_MODE_COMMAND message,
transmitted after the DIRECT_SECURITY_MOD-
E_COMMAND message is transmitted,
transmitted after the DIRECT_SECURITY_MOD-
E_COMPLETE message is received,
transmitted simultaneously with a DIRECT_COMMUNI-
CATION_ACCEPT message,
transmitted by being multiplexed with the DIRECT_
COMMUNICATION_ACCEPT message, or
transmitted after the DIRECT_COMMUNICATION_
ACCEPT message is transmitted.

The message may include some or all of pieces of information below as the RC5 RRC message of step 3b-25 generated via RRC:

An indicator or IE explicitly indicating whether to use a reconfiguration transmission resource pool and/or reception resource pool:
  Through the indicator or IE, two UEs determine whether to use the Preconfiguration transmission resource pool and/or reception resource pool or to use a separate transmission/reception pool based on a resource assignment mode (scheduled resource assignment (mode 1 or mode 3) and/or UE autonomous resource selection (mode 2 or mode 4)) when transmitting and receiving V2X data packets via NR V2X SL unicast. For example, the indicator or IE may be represented in a form of TRUE/FALSE or BOOLEAN or in a form of INTEGER or ENUMERATED.
  For example, the Preconfiguration transmission resource pool may denote v2x-CommTxPoolList or p2x-CommTxPoolList included in SL-V2X-Preconfiguration IE, and the Preconfiguration reception resource pool may denote v2x-CommRxPoolList included in SL-V2X-Preconfiguration IE.
An indicator or IE indicating a response to establishment of a link for a purpose of one-to-one (unicast) and/or one-to-relay (unicast) and/or one-to-many (groupcast and/or multicast and/or broadcast):
  Through the indicator or IE, a response or rejection regarding performing of NR V2X SL communication between two UEs through one-to-one unicast may be indicated. For example, the indicator or IE may be represented in a form of INTEGER or ENUMERATED.
IE related to 5G QoS indicator (5QI) or V2X QoS indicator (VQI) indicating QoS-related information:
  Through the IE, QoS information that is used for a desired V2X service during NR V2X SL communication may be indicated via unicast between two UEs. For example, the IE may include a list of 5QI or VQI.
IE including PPPP and/or PPPR indicating QoS-related information or traffic pattern information:
  Through the IE, QoS information that is used for a desired V2X service during NR V2X SL communication may be indicated via unicast between two UEs. For example, the IE may include PPPPInfoSL and/or reliabilityInfoListSL and/or SL-V2X-Packet-DuplicationConfig and/or trafficPatternInfoListSL.
Partial resource pool information IE among Preconfiguration transmission resource pool and/or reception resource pool:
  Through the IE, two UEs may perform NR V2X SL communication via unicast by using a partial resource pool among the Preconfiguration transmission resource pool and/or reception resource pool. For example, the IE may be transmission resource pool v2x-CommTxPoolList or p2x-CommTxPoolList and/or v2x-CommRxPoolList or reception resource pool v2x-CommTxPoolList included in SL-V2X-Preconfiguration.
IE including separate SL transmission/reception resource pool information through resource assignment mode (scheduled resource assignment (mode 1 or mode 3) or UE autonomous resource selection (mode 2 or mode 4)):
  When the IE is included, two UEs may determine that NR V2X SL communication is to be performed via unicast by using a separate transmission/reception resource pool included in the IE.
  The separate SL transmission/reception resource pool may denote partial or entire transmission/reception resource pool included in system information or RRCReconfiguration message. For example, the separate SL transmission/reception resource pool may be partial or entire transmission/reception resource pool information (v2x-CommTxPool and/or v2x-CommTxPoolNormalCommon and/or p2x-CommTxPoolNormalPool and/or v2x-CommTx-PoolExceptional and/or v2x-InterFreqInfoList IE) included in SL-V2X-ConfigCommon IE included in system information or partial or entire transmission/reception resource pool information included in sl-V2X-ConfigDedicated IE included in the RRCReconfiguration message.
  When the IE is empty (absent), the two UEs may implicitly determine that NR V2X SL communication is to be performed via unicast by using the Preconfiguration transmission resource and/or reception resource.

The other vehicle terminal or pedestrian mobile terminal 3b-02 may determine that the PC5-RRC message is not received successfully from the vehicle terminal 3b-01. The other vehicle terminal or pedestrian mobile terminal 3b-02 may determine that the PC5-RRC message is not received successfully in at least one of following cases.

When decoding of the PC5-RRC message received in operation 3f-15 fails (for example, integrity check failure) based on a security algorithm (integrity protection algorithm and/or ciphering algorithm) to be used in the AS layer via the direct security mode procedure and a security key derived therethrough.
When it is unable to comply with (part of) the configuration included in the PC5-RRC message received in operation 3b-15.

When the other vehicle terminal or pedestrian mobile terminal 3b-02 determines that the PC5-RRC message is not received from the vehicle terminal 3b-01 successfully, the other vehicle terminal or pedestrian mobile terminal 3b-02 transmits the PC5-RRC message to the vehicle terminal 3b-01 in response (step 3b-25). For example, the PC5-RRC message may be a message for releasing the unicast link established or to be established (for example, a PC5-RRC release message). The message may include a reason why the link is released (ReleaseCause). Alternatively, the PC5-RRC message may be a message indicating the PC5-RRC message is not received successfully from the vehicle terminal 3b-01 (for example, a PC5-RRC reject message). The PC5-RRC message may include a reason why the PC5-RRC message is not received successfully (RejectCause). When it is unable to apply or comply with the (part of) configuration information included in the PC5-RRC message, the PC5-RC message may include corresponding information.

When the vehicle terminal 3b-01 receives the PC5-RRC message indicating that the PC5-RRC message transmitted in step 3b-15 from the other vehicle terminal or pedestrian mobile terminal 3b-02 is not received successfully, the vehicle terminal 3b-01 may perform at least one of following in step 3b-40:

- The PC5-RRC message may be retransmitted to the other vehicle terminal or pedestrian mobile terminal 3b-02 to perform the AS layer connection establishment procedure. When information unable to apply or comply with the configuration information is included in the PC5-RRC message in step 3b-25, the vehicle terminal 3b-01 may transmit, to the other vehicle terminal or pedestrian mobile terminal 3b-02, the PC5-RRC message by changing or not including the corresponding configuration information. In other words, the vehicle terminal 3b-01 may transmit the PC5-RRC message to the other vehicle terminal or pedestrian mobile terminal 3b-02 in step 3b-40 by modifying the configuration information included in the PC5-RRC message transmitted in step 3b-15.
- The AS layer of the vehicle terminal 3b-01 may instruct the upper layer to release the unicast link. The vehicle terminal 3b-01 may transmit, to the other vehicle terminal or pedestrian mobile terminal 3b-02, the PC5-Signaling message to release the unicast link established or to be established. For example, the PC5-Signaling message may be a disconnect request message.
- The AS layer of the vehicle terminal 3b-01 may instruct the upper layer to release the unicast link and release the unicast link established or to be established without a separate signaling procedure.

When the other vehicle terminal or pedestrian mobile terminal 3b-02 receives the PC5-RRC message successfully in step 3b-40, the other vehicle terminal or pedestrian mobile terminal 3b-02 may transmit the PC5=RRC message to the vehicle terminal 3b-01 in response, in step 3b-40.

When the other vehicle terminal or pedestrian mobile terminal 3b-02 receives the disconnect request message that is the PC5-Signaling message in step 3b-40, the other vehicle terminal or pedestrian mobile terminal 3b-02 may transmit a disconnect response message to the vehicle terminal 3b-01 in response, in step 3b-45.

Figure 3C:
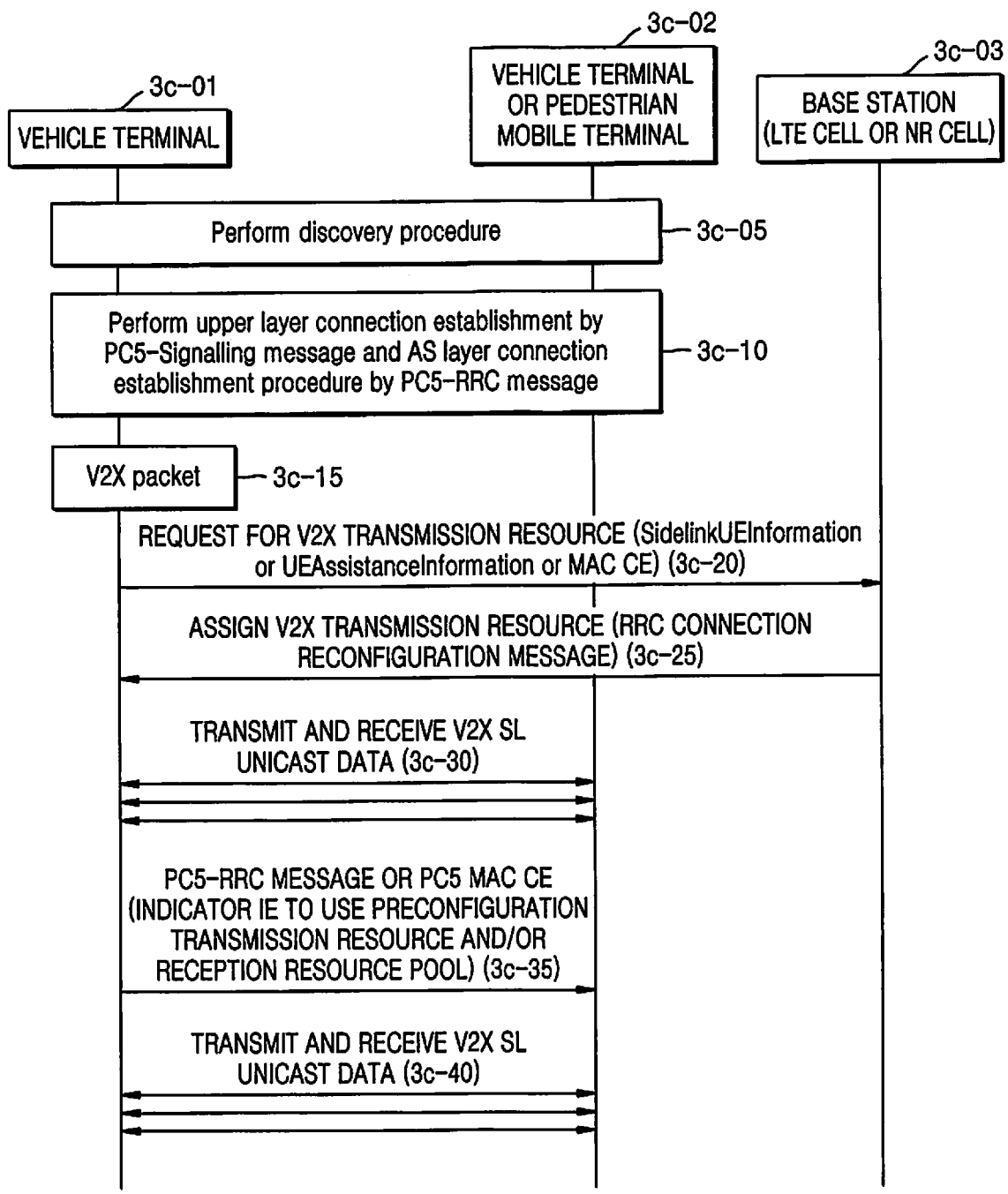
FIG. 3C is a signal flow diagram illustrating procedures of performing NR V2X SL unicast communication via a preconfiguration transmission resource pool and/or reception resource pool in an inter-UE scheduled resource assignment mode, according to an embodiment.

FIG. 3C is a signal flow diagram illustrating procedures for performing NR V2X SL unicast communication via a preconfiguration transmission resource pool and/or reception resource pool in an inter-UE scheduled resource assignment mode, according to an embodiment.

Referring to FIG. 3C, a vehicle terminal 3c-01 performs a discovery procedure with another vehicle terminal or pedestrian mobile terminal 3c-02 in step 3c-05, and performs a unicast link establishment procedure for NR V2X SL communication in step 3c-10. The unicast link establishment procedure may be performed via the embodiment of the disclosure described above.

When a V2X packet is generated in step 3c-15, the vehicle terminal 3c-01 may perform NR V2X SL unicast with the other vehicle terminal or pedestrian mobile terminal 3c-02.

When operating in a scheduled resource assignment mode (mode 1 or mode 3), the vehicle terminal 3c-01 requests a transmission resource for performing the NR V2X SL unicast from a base station 3c-03, in step 3c-20. That is, the vehicle terminal 3c-01 may request the transmission resource by transmitting an RRC message (e.g., SidelinkUE-Information or UEAssistInformation) or MAC CE to the base station 3c-03. In response, the base station 3c-03 may assign a V2X transmission resource to the vehicle terminal 3c-01 via a dedicated RRC message (step 3c-25). For example, the dedicated RRC message may be an RRC connection reconfiguration message (RRCReconfiguration message). The vehicle terminal 3c-01 may select a resource from resources or exceptional resources (exceptional pool) indicated from the base station 3c-03, and transmit V2X data to the other vehicle terminal or pedestrian mobile terminal 3c-02 (step 3c-30). Here, the exceptional pool may denote a resource pool pre-configured to be selected in a specific situation, not in a general situation. Steps 3c-20 and 3c-25 may be performed before step 3c-10. In this case, the vehicle terminal 3c-01 may perform the NR V2X SL unicast communication by transmitting, to the other vehicle terminal or pedestrian mobile terminal 3c-02 via a PC5-RRC message, the resource indicated from the base station 3c-03 via the dedicated RRC message in step 3c-10.

To perform the NR V2X SL unicast communication through the Preconfiguration transmission resource pool and/or reception resource pool based on the scheduled resource assignment mode, the vehicle terminal 3c-01 transmits a PC5-RRC message or PC5 MAC CE to the other vehicle terminal or pedestrian mobile terminal 3c-02 (step 3c-35). The NR V2X SL unicast communication is performed through the Preconfiguration transmission resource pool and/or reception resource pool in the scheduled resource assignment mode due to one or more reasons below:

- When a UE in an RRC connected mode is transited to an RRC inactive mode or an RRC idle mode. For example:
  - when an RRCRelease message is received from a base station,
  - when RRC reconfiguration procedure failed (Reconfiguration Failure), or
  - when an RRCReject message is received from a base station.
- Out of coverage of E-UTRA/NR The PC5-RRC message or PC5 MAC CE may include some or all pieces of information below:

- An indicator or IE explicitly indicating whether to use a reconfiguration transmission resource pool and/or reception resource pool.
  - Through the indicator or IE, two UEs may determine that V2X data packets are to be transmitted and received via an NR V2X SL unicast by using the Preconfiguration transmission resource pool and/or reception resource pool. For example, the indicator or IE may be represented in a form of TRUE/FALSE or BOOLEAN or in a form of INTEGER or ENUMERATED.
  - For example, the Preconfiguration transmission resource pool may denote v2x-CommTxPoolList or p2x-CommTxPoolList included in SL-V2X-Preconfiguration IE, and the Preconfiguration reception resource pool may denote v2x-CommRxPoolList included in SL-V2X-Preconfiguration IE.
- Partial resource pool information IE among Preconfiguration transmission resource pool and/or reception resource pool.
  - Through the IE, two UEs may perform NR V2X SL communication via unicast by using a partial resource pool among the Preconfiguration transmission resource pool and/or reception resource pool.

For example, the IE may be transmission resource pool v2x-CommTxPoolList or p2x-CommTxPoolList and/or v2x-CommRxPoolList or reception resource pool v2x-CommTxPoolList included in SL-V2X-Preconfiguration.

IE including separate SL transmission/reception resource pool information through resource assignment mode (scheduled resource assignment (mode 1 or mode 3) or UE autonomous resource selection (mode 2 or mode 4)).

When the IE is empty (absent), the two UEs may implicitly determine that NR V2X SL communication is to be performed via unicast by using the Preconfiguration transmission resource and/or reception resource.

In step 3c-40, when the V2X packet is generated, the vehicle terminal 3c-01 performs the NR V2X SL unicast with the other vehicle terminal or pedestrian mobile terminal 3c-02 by using the Preconfiguration transmission resource pool and/or reception resource pool.

Figure 3D:
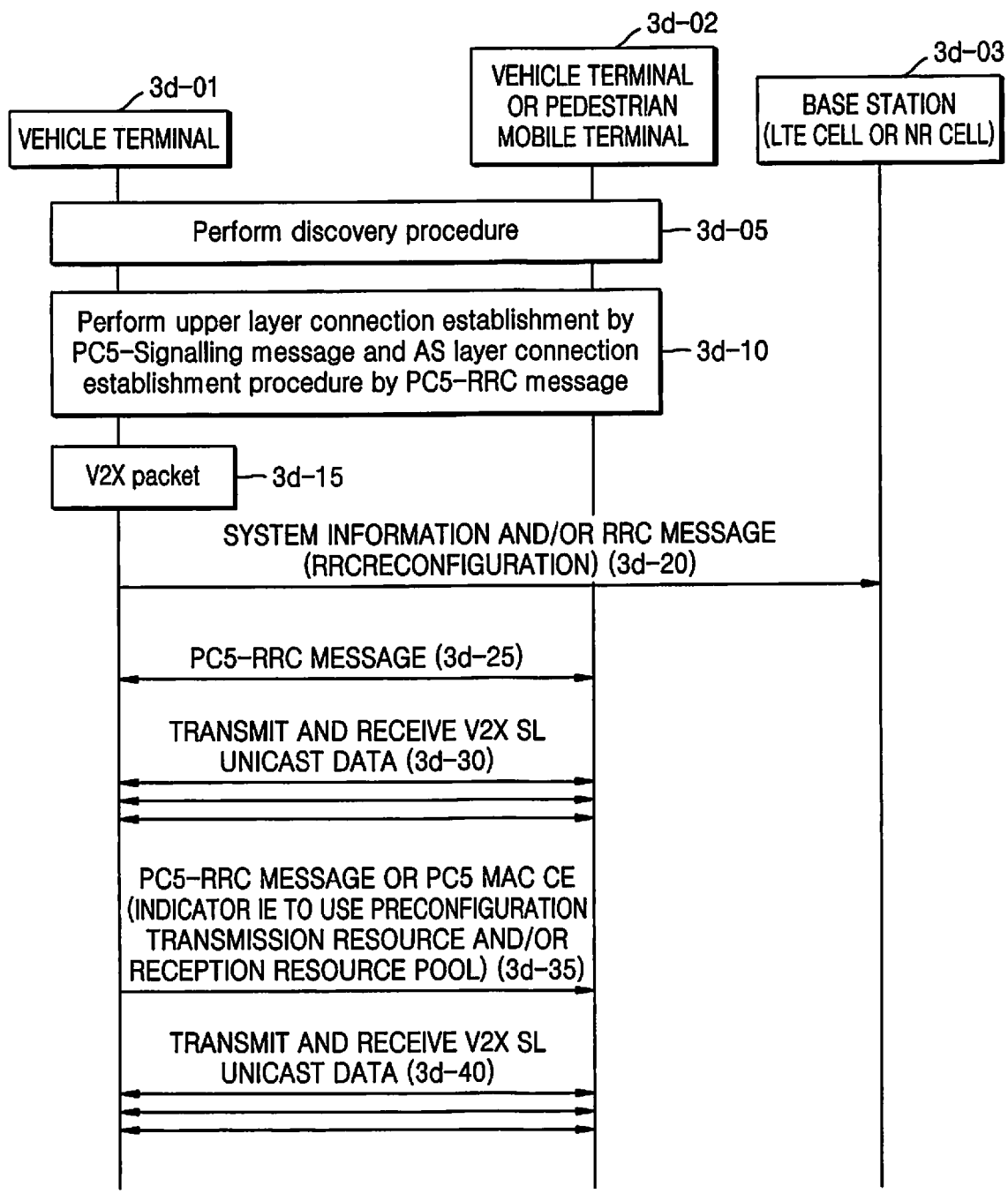
FIG. 3D is a signal flow diagram illustrating procedures of performing NR V2X SL unicast communication via a preconfiguration transmission resource pool and/or reception resource pool in an inter-UE UE autonomous resource selection mode, according to an embodiment.

FIG. 3D is a signal flow diagram illustrating a procedure for performing NR V2X SL unicast communication via a preconfiguration transmission resource pool and/or reception resource pool in an inter-UE UE autonomous resource selection mode, according to an embodiment.

Referring to FIG. 3D, a vehicle terminal 3d-01 performs a discovery procedure with another vehicle terminal or pedestrian mobile terminal 3d-02 in step 3d-05, and performs a unicast link establishment procedure for NR V2X SL communication in step 3d-10. The unicast link establishment procedure may be performed via the embodiment of the disclosure described above.

When a V2X packet is generated in step 3d-15, the vehicle terminal 3d-01 performs NR V2X SL unicast with the other vehicle terminal or pedestrian mobile terminal 3d-02.

When operating in the UE autonomous resource selection mode (mode 2 or mode 4), the vehicle terminal 3d-01 may perform V2X SL unicast data transmission and reception with the other vehicle terminal or pedestrian mobile terminal 3d-02 by using system information or RRC message (e.g., an RRCReconfiguration message) transmitted by a base station 3d-03 in step 3d-20 and/or an SL transmission and reception resource pool received via an inter-UE PC5-RRC message in step 3d-25. Steps 3d-20 and/or 3d-25 may be performed before step 3d-15.

To perform the NR V2X SL unicast communication through the Preconfiguration transmission resource pool and/or reception resource pool based on the UE autonomous resource selection mode, the vehicle terminal 3d-01 may transmit a PC5-RRC message or PC5 MAC CE to the other vehicle terminal or pedestrian mobile terminal 3d-02 (step 3d-35). The NR V2X SL unicast communication is performed through the Preconfiguration transmission resource pool and/or reception resource pool in the UE autonomous resource selection mode due to one or more reasons below:

When a UE in an RRC connected mode is transited to an RRC inactive mode or an RRC idle mode. For example, when an RRCRelease message is received from a base station,
when RRC reconfiguration procedure failed (Reconfiguration Failure), or
when an RRCReject message is received from a base station.
Out of coverage of E-UTRA/NR The PC5-RRC message or PC5 MAC CE may include some or all pieces of information below:

An indicator or IE explicitly indicating whether to use a reconfiguration transmission resource pool and/or reception resource pool.

Through the indicator or IE, two UEs may determine that V2X data packets are to be transmitted and received via an NR V2X SL unicast by using the Preconfiguration transmission resource pool and/or reception resource pool. For example, the indicator or IE may be represented in a form of TRUE/FALSE or BOOLEAN or in a form of INTEGER or ENUMERATED.

For example, the Preconfiguration transmission resource pool may denote v2x-CommTxPoolList or p2x-CommTxPoolList included in SL-V2X-Preconfiguration IE, and the Preconfiguration reception resource pool may denote v2x-CommRxPoolList included in SL-V2X-Preconfiguration IE.

Partial resource pool information IE among Preconfiguration transmission resource pool and/or reception resource pool.

Through the IE, two UEs may perform NR V2X SL communication via unicast by using a partial resource pool among the Preconfiguration transmission resource pool and/or reception resource pool. For example, the IE may be transmission resource pool v2x-CommTxPoolList or p2x-CommTxPoolList and/or v2x-CommRxPoolList or reception resource pool v2x-CommTxPoolList included in SL-V2X-Preconfiguration.

IE including separate SL transmission/reception resource pool information through resource assignment mode (scheduled resource assignment (mode 1 or mode 3) or UE autonomous resource selection (mode 2 or mode 4)).

When the IE is empty (absent), the two UEs may implicitly determine that NR V2X SL communication is to be performed via unicast by using the Preconfiguration transmission resource and/or reception resource.

In step 3d-40, when the V2X packet is generated, the vehicle terminal 3d-01 may perform the NR V2X SL unicast with the other vehicle terminal or pedestrian mobile terminal 3d-02 by using the Preconfiguration transmission resource pool and/or reception resource pool.

Figure 3E:
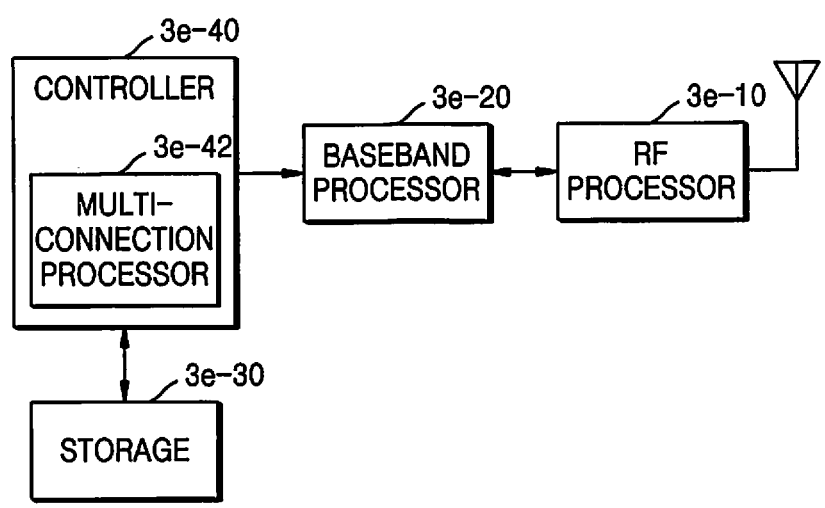
FIG. 3E illustrates a UE, according to an embodiment.

FIG. 3E illustrates a UE, according to an embodiment.

Referring to FIG. 3E, the UE includes a radio frequency (RF) processor 3e-10, a baseband processor 3e-20, a storage 3e-30, and a controller 3e-40. The RF processor 3e-10 may perform functions for transmitting and receiving a signal via a radio channel, such as a band conversion, amplification, etc., of the signal. That is, the RF processor 3e-10 may up-convert a baseband signal provided from the baseband processor 3e-20, to an RF band signal and transmit the RF band signal through an antenna, and down-convert an RF band signal received through an antenna, to a baseband signal. For example, the RF processor 3e-10 may include a transmit filter, a receive filter, an amplifier, a mixer, an oscillator, a digital-to-analog converter (DAC), and an analog-to-digital converter (ADC). Although only a single antenna is illustrated in FIG. 3e, the UE may include multiple antennas. The RF processor 3e-10 may include a plurality of RF chains. The RF processor 3e-10 may perform beamforming. For beamforming, the RF processor 3e-10 may adjust phases and amplitudes of signals transmitted or received through multiple antennas or antenna elements. The RF processor 3e-10 may perform MIMO and may receive data of multiple layers in the MIMO operation. The RF processor 3e-10 may perform received beam sweeping by appropriately configuring multiple antennas or antenna elements, or adjust a direction and a beam width of the received beam to coordinate with a transmit beam, under the control of the controller 3e-40.

The baseband processor 3e-20 may convert between a baseband signal and a bitstream based on physical layer specifications of a system. For example, for data transmission, the baseband processor 3e-20 may generate complex symbols by encoding and modulating a transmit bitstream. For data reception, the baseband processor 3e-20 may reconstruct a received bitstream by demodulating and decoding a baseband signal provided from the RF processor 3e-10. For example, according to an OFDM scheme, for data transmission, the baseband processor 3e-20 may generate complex symbols by encoding and modulating a transmit bitstream, map the complex symbols to subcarriers, and then configure OFDM symbols by performing an inverse fast Fourier transform (IFFT) operation and cyclic prefix (CP) insertion. For data reception, the baseband processor 3e-20 may split a baseband signal provided from the RF processor 3e-10, in OFDM symbol units, reconstruct signals mapped to subcarriers by performing a fast Fourier transform (FFT) operation, and then reconstruct a received bitstream by demodulating and decoding the signals.

The baseband processor 3e-20 and the RF processor 3e-10 may transmit and receive signals as described above. As such, each of the baseband processor 3e-20 and the RF processor 3e-10 may also be referred to as a transmitter, a receiver, a transceiver, or a communicator. At least one of the baseband processor 3e-20 or the RF processor 3e-10 may include multiple communication modules to support multiple different radio access technologies. At least one of the baseband processor 3e-20 or the RF processor 3e-10 may include multiple communication modules to process signals of different frequency bands. For example, the different radio access technologies may include an LTE network, NR network, etc. The different frequency bands may include a super high frequency (SHF) (e.g., 2.5 GHz and 5 GHz) band and a mmWave (e.g., 60 GHz) band.

The storage 3e-30 may store data for operation of the base station described above, e.g., basic programs, application programs, and configuration information. The storage 3e-30 may provide the stored data upon request by the controller 3e-40.

The controller 3e-40 may control overall operations of the UE. For example, the controller 3e-40 may transmit and receive signals through the baseband processor 3e-20 and the RF processor 3e-10. The controller 3e-40 may record and read data on and from the storage 3e-30. In this regard, the controller 3e-40 may include at least one processor. For example, the controller 3e-40 may include a communication processor (CP) performing control for communication, and an application processor (AP) controlling an upper layer, such as an application program. The controller 3e-40 may include a multi-connection processor 3e-42 performing processes for operating in a multi-connection mode.

Figure 3F:
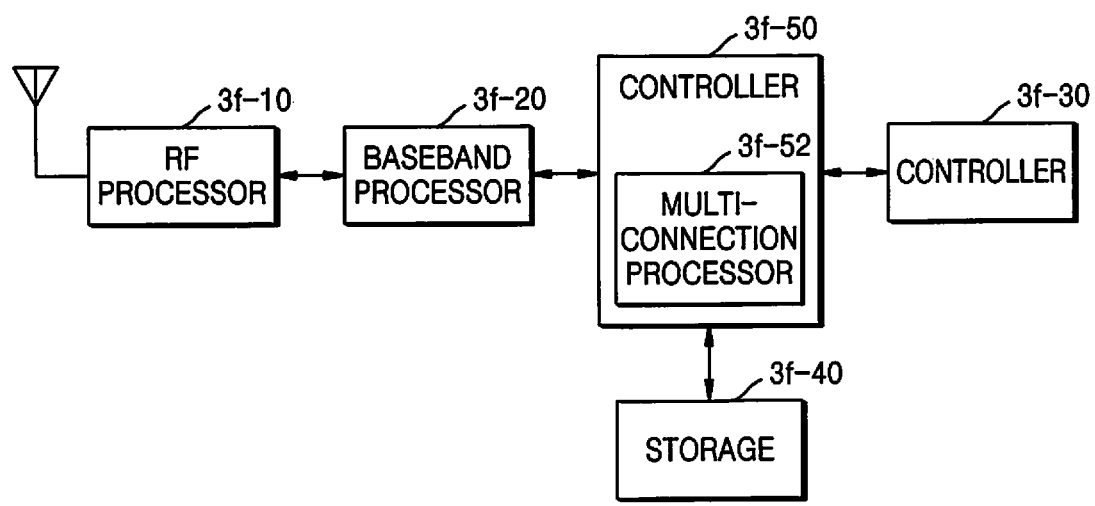
FIG. 3F illustrates a base station, according to an embodiment.

FIG. 3F illustrates a base station, according to an embodiment.

Referring to FIG. 3F, the base station may include at least one transmission reception point (TRP). The base station includes an RF processor 3f-10, a baseband processor 3f-20, a communicator 3f-30, a storage 3f-40, and a controller 3f-50.

The RF processor 3f-10 may perform functions for transmitting and receiving signals through radio channels, e.g., signal band conversion and amplification. That is, the RF processor 3f-10 up-converts a baseband signal provided from the baseband processor 3f-20, to an RF band signal and transmit the RF band signal through an antenna, and down-converts an RF band signal received through an antenna, to a baseband signal. For example, the RF processor 3f-10 may include a transmit filter, a receive filter, an amplifier, a mixer, an oscillator, a DAC, and an ADC.

Although only a single antenna is illustrated in FIG. 3F, the base station may include multiple antennas.

The RF processor 3f-10 may include a plurality of RF chains. In addition, the RF processor 3f-10 may perform beamforming. For beamforming, the RF processor 3f-10 may adjust phases and amplitudes of signals transmitted or received through multiple antennas or antenna elements. The RF processor 3f-10 may perform a DL MIMO operation by transmitting at least one layer.

The baseband processor 3f-20 may convert between a baseband signal and a bitstream based on physical layer specifications of a first radio access technology. For example, for data transmission, the baseband processor 3f-20 may generate complex symbols by encoding and modulating a transmit bitstream. For data reception, the baseband processor 3f-20 may reconstruct a received bitstream by demodulating and decoding a baseband signal provided from the RF processor 3f-10. For example, according to an OFDM scheme, for data transmission, the baseband processor 3f-20 may generate complex symbols by encoding and modulating a transmit bitstream, map the complex symbols to subcarriers, and then configure OFDM symbols by performing IFFT and CP insertion.

For data reception, the baseband processor 3f-20 may split a baseband signal provided from the RF processor 3f-10, in OFDM symbol units, reconstruct signals mapped to subcarriers by performing FFT, and then reconstruct a received bitstream by demodulating and decoding the signals. The baseband processor 3f-20 and the RF processor 3f-10 may transmit and receive signals as described above.

As such, each of the baseband processor 3f-20 and the RF processor 3f-10 may also be called a transmitter, a receiver, a transceiver, a communicator, or a wireless communicator.

The communicator 3f-30 may provide an interface for communicating with other nodes in a network. For example, the communicator 3f-30 may convert a bit string transmitted from the base station to another node, such as an auxiliary base station or a core network, into a physical signal, and convert a physical signal received from the other node into a bit string.

The storage 3f-40 may store data for operation of the base station described above, e.g., basic programs, application programs, and configuration information. In particular, the storage 3f-40 may store information about bearers allocated for a connected UE, a measurement report transmitted from the connected UE, etc. The storage 3f-40 may store criteria information used to determine whether to provide or release multi-connectivity to or from the UE. The storage 3f-40 may provide the stored data upon request by the controller 3f-50.

The controller 3f-50 may control overall operations of the base station. For example, the controller 3f-50 may transmit and receive signals through the baseband processor 3f-20 and the RF processor 3f-10 or through the communicator 3f-30. The controller 3f-50 may record and read data on and from the storage 3f-40. In this regard, the controller 3f-50 may include at least one processor. The controller 3f-50 may include a multi-connection processor 3f-52 performing processes for operating in a multi-connection mode.

The methods according to the above-described embodiments of the disclosure may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments of the disclosure described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the disclosure. Another storage device on the communication network may also be connected to the apparatus performing the embodiments of the disclosure.

In the above-described embodiments of the disclosure, elements included in the disclosure are expressed in a singular or plural form according to the embodiments. However, the singular or plural form is appropriately selected for convenience of explanation and the disclosure is not limited thereto. As such, an element expressed in a plural form may also be configured as a single element, and an element expressed in a singular form may also be configured as plural elements.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a terminal in a wireless communication system, the method comprising:
   receiving, from a base station, a radio resource control (RRC) message including information indicating that a full configuration procedure is configured;
   in case that protocol data unit (PDU) session is included in a current configuration of the terminal and the PDU session is not added to information associated with an addition or a modification of a data radio bearer (DRB), identifying whether an indicator associated with a handover is included in the RRC message, wherein the information associated with addition or the modification of the DRB is included in the RRC message; and
   transmitting, to an upper layer, a message indicating a release of a user plane resource associated with the PDU session, based on a result of the identifying.

2. The method of claim 1, wherein transmitting the message indicating the release of the user plane resource associated with the PDU session, based on the result of the identifying comprises:
   in case that the indicator associated with the handover is included in the RRC message., transmitting, to the upper layer, the message indicating the release of the user plane resource associated with the PDU session after a procedure of the handover is successfully completed.

3. The method of claim 1, wherein transmitting the message indicating the release of the user plane resource associated with the PDU session, based on the result of the identifying comprises:
   in case that the indicator associated with the handover is not included in the RRC message, immediately transmitting, to the upper layer, the message indicating the release of the user plane resource associated with the PDU session.

4. The method of claim 1, wherein the indicator associated with the handover comprises an indicator related to reconfiguration with sync.

5. The method of claim 1, wherein the RRC message comprises at least one of an RRC reconfiguration message or an RRC resume message.

6. The method of claim 1, further comprising:
   receiving, from the base station, an RRC release message including priority information related to cell reselection and a timer;
   starting the timer included in the RRC release message;
   selecting a cell on which the terminal is to camp; and
   determining whether to apply the priority information and a remaining validity time of the timer to the cell reselection, based on a type of the selected cell.

7. The method of claim 6, wherein the remaining validity time of the timer is from a first time when the terminal selects the cell to camp on to a second time when a time preset in the timer is expired.

8. The method of claim 7, wherein determining whether to apply the priority information and the remaining validity time of the timer comprises:
   in case that the selected cell is at least one of a global system for mobile communications (GSM) cell or a universe mobile telecommunication system (UMTS) terrestrial radio access network (UTRAN) cell, determining not to apply the priority information and the remaining validity time of the timer to the cell reselection.

9. The method of claim 7, wherein determining whether to apply the priority information and the remaining validity time of the timer comprises:
   in case that the selected cell is not at least one of a global system for mobile communications (GSM) cell or a universe mobile telecommunication system (UMTS) terrestrial radio access network (UTRAN) cell, determining to apply the priority information and the remaining validity time of the timer to the cell reselection.

10. A terminal in a wireless communication system, the terminal comprising:
    a transceiver; and
    at least one processor configured to:
    receive via the transceiver, from a base station, a radio resource control (RRC) message including information indicating that a full configuration procedure is configured, in case that protocol data unit (PDU) session is included in a current configuration of the terminal and the PDU session is not added to information associated with an addition or a modification of a data radio bearer (DRB), identify whether an indicator associated with a handover is included in the RRC message, wherein the information associated with the addition or the modification of the DRB is included in the RRC message, and transmit via the transceiver, to an upper layer, a message indicating a release of a user plane resource associated with the PDU session, based on a result of the identification.

11. The terminal of claim 10, wherein the at least one processor is further configured to, in case that the indicator associated with the handover is included in the RRC message, transmit via the transceiver, to the upper layer, the message indicating the release of the user plane resource associated with the PDU session after a procedure of the handover is successfully completed.

12. The terminal of claim 10, wherein the at least one processor is further configured to, in case that the indicator associated with the handover is not included in the RRC message, immediately transmit via the transceiver, to the upper layer, the message indicating the release of the user plane resource associated with the PDU session.

13. The terminal of claim 10, wherein the indicator associated with the handover comprises an indicator related to reconfiguration with sync.

14. The terminal of claim 10, wherein the RRC message comprises at least one of an RRC reconfiguration message or an RRC resume message.

15. The terminal of claim 10, wherein the at least one processor is further configured to:
receive via the transceiver, from the base station, an RRC release message including priority information related to cell reselection and a timer,
start the timer included in the RRC release message,
select a cell on which the terminal is to camp, and
determine whether to apply the priority information and a remaining validity time of the timer to the cell reselection, based on a type of the selected cell.

16. The terminal of claim 15, wherein the remaining validity time of the timer is from a first time when the terminal selects the cell to camp on to a second time when a time preset in the timer is expired.

17. The terminal of claim 16, wherein the at least one processor is further configured to:
in case that the selected cell is at least one of a global system for mobile communications (GSM) cell or a universe mobile telecommunication system (UMTS) terrestrial radio access network (UTRAN) cell, determine not to apply the priority information and the remaining validity time of the timer to the cell reselection.

18. The terminal of claim 16, wherein the at least one processor is further configured to:
in case that the selected cell is not at least one of a global system for mobile communications (GSM) cell or a universe mobile telecommunication system (UMTS) terrestrial radio access network (UTRAN) cell, determine to apply the priority information and the remaining validity time of the timer to the cell reselection.

* * * * *